US008362710B2

(12) United States Patent
Langovsky

(10) Patent No.: US 8,362,710 B2
(45) Date of Patent: Jan. 29, 2013

(54) DIRECT AC-TO-DC CONVERTER FOR PASSIVE COMPONENT MINIMIZATION AND UNIVERSAL OPERATION OF LED ARRAYS

(75) Inventor: Nick Langovsky, Plymouth, MI (US)

(73) Assignee: ilumisys, Inc., Troy, MI (US)

( * ) Notice: Subject to any disclaimer, the term of this patent is extended or adjusted under 35 U.S.C. 154(b) by 562 days.

(21) Appl. No.: 12/689,498

(22) Filed: Jan. 19, 2010

(65) Prior Publication Data
US 2010/0181933 A1    Jul. 22, 2010

Related U.S. Application Data

(60) Provisional application No. 61/146,041, filed on Jan. 21, 2009.

(51) Int. Cl.
*H05B 37/02* (2006.01)
(52) U.S. Cl. .............. 315/291; 315/209 R; 315/307; 315/308
(58) Field of Classification Search ........... 315/209 R, 315/224–226, 246, 291, 307, 308, 320, 361, 315/362
See application file for complete search history.

(56) References Cited

U.S. PATENT DOCUMENTS

| D54,511 S | 2/1920 | Owen |
|---|---|---|
| D58,105 S | 6/1921 | Poritz |
| D79,814 S | 8/1929 | Hoch |
| D80,419 S | 1/1930 | Kramer |
| D84,763 S | 7/1931 | Stange |
| D119,797 S | 4/1940 | Winkler et al. |
| D125,312 S | 2/1941 | Logan |
| 2,909,097 A | 10/1959 | Alden et al. |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |
| 3,612,855 A | 10/1971 | Juhnke |
| 3,643,088 A | 2/1972 | Osteen et al. |

(Continued)

FOREIGN PATENT DOCUMENTS

| CN | 1584388 A | 2/2005 |
|---|---|---|
| CN | 2766345 Y | 3/2006 |

(Continued)

OTHER PUBLICATIONS

Notification, International Search Report and Written Opinion dated Jul. 30, 2010 from the corresponding International Application No. PCT/US2010/021448.

(Continued)

*Primary Examiner* — Jimmy Vu
(74) *Attorney, Agent, or Firm* — Young Basile

(57) ABSTRACT

Disclosed herein is a power converter circuit for a LED lighting device. The power converter includes a pair of input terminals adapted to be connected to a signal source, at least one LED, a first circuit adapted to supply current to the at least one LED and including: a first bi-directional switch connected between one input terminal and one side of the at least one LED, and a second bi-directional switch connected between the other side of the at least one LED and the other input terminal, and a second circuit adapted to supply current to the at least one LED and including: a third bi-directional switch connected between the other input terminal and the one side of the at least one LED, and a fourth bi-directional switch connected between the one input terminal and the other side of the at least one LED.

22 Claims, 8 Drawing Sheets

U.S. PATENT DOCUMENTS

| | | |
|---|---|---|
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,661,890 A | 4/1987 | Watanabe et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,771,274 A | 9/1988 | Havel |
| 4,780,621 A | 10/1988 | Bartleucci et al. |
| 4,794,383 A | 12/1988 | Havel |
| 4,810,937 A | 3/1989 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,912,371 A | 3/1990 | Hamilton |
| 4,922,154 A | 5/1990 | Cacoub |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,032,960 A | 7/1991 | Katoh |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,344,068 A | 9/1994 | Haessig |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |

| | | | | | |
|---|---|---|---|---|---|
| 5,412,552 A | 5/1995 | Fernandes | 5,848,837 A | 12/1998 | Gustafson |
| 5,420,482 A | 5/1995 | Phares | 5,850,126 A | 12/1998 | Kanbar |
| 5,421,059 A | 6/1995 | Leffers, Jr. | 5,851,063 A | 12/1998 | Doughty et al. |
| 5,430,356 A | 7/1995 | Ference et al. | 5,852,658 A | 12/1998 | Knight et al. |
| 5,432,408 A | 7/1995 | Matsuda et al. | 5,854,542 A | 12/1998 | Forbes |
| 5,436,535 A | 7/1995 | Yang | RE36,030 E | 1/1999 | Nadeau |
| 5,436,853 A | 7/1995 | Shimohara | 5,859,508 A | 1/1999 | Ge et al. |
| 5,450,301 A | 9/1995 | Waltz et al. | 5,865,529 A | 2/1999 | Yan |
| 5,461,188 A | 10/1995 | Drago et al. | 5,890,794 A | 4/1999 | Abtahi et al. |
| 5,463,280 A | 10/1995 | Johnson | 5,896,010 A | 4/1999 | Mikolajczak et al. |
| 5,463,502 A | 10/1995 | Savage, Jr. | 5,907,742 A | 5/1999 | Johnson et al. |
| 5,465,144 A | 11/1995 | Parker et al. | 5,912,653 A | 6/1999 | Fitch |
| 5,475,300 A | 12/1995 | Havel | 5,921,660 A | 7/1999 | Yu |
| 5,489,827 A | 2/1996 | Xia | 5,924,784 A | 7/1999 | Chliwnyj et al. |
| 5,491,402 A | 2/1996 | Small | 5,927,845 A | 7/1999 | Gustafson et al. |
| 5,493,183 A | 2/1996 | Kimball | 5,934,792 A | 8/1999 | Camarota |
| 5,504,395 A | 4/1996 | Johnson et al. | 5,943,802 A | 8/1999 | Tijanic |
| 5,506,760 A | 4/1996 | Giebler et al. | 5,946,209 A | 8/1999 | Eckel et al. |
| 5,513,082 A | 4/1996 | Asano | 5,949,347 A | 9/1999 | Wu |
| 5,519,496 A | 5/1996 | Borgert et al. | 5,952,680 A | 9/1999 | Strite |
| 5,530,322 A | 6/1996 | Ference et al. | 5,959,547 A | 9/1999 | Tubel et al. |
| 5,544,809 A | 8/1996 | Keating et al. | 5,962,989 A | 10/1999 | Baker |
| 5,545,950 A | 8/1996 | Cho | 5,962,992 A | 10/1999 | Huang et al. |
| 5,550,440 A | 8/1996 | Allison et al. | 5,963,185 A | 10/1999 | Havel |
| 5,559,681 A | 9/1996 | Duarte | 5,974,553 A | 10/1999 | Gandar |
| 5,561,346 A | 10/1996 | Byrne | 5,980,064 A | 11/1999 | Metroyanis |
| D376,030 S | 11/1996 | Cohen | 5,998,925 A | 12/1999 | Shimizu et al. |
| 5,575,459 A | 11/1996 | Anderson | 5,998,928 A | 12/1999 | Hipp |
| 5,575,554 A | 11/1996 | Guritz | 6,007,209 A | 12/1999 | Pelka |
| 5,581,158 A | 12/1996 | Quazi | 6,008,783 A | 12/1999 | Kitagawa et al. |
| 5,592,051 A | 1/1997 | Korkala | 6,011,691 A | 1/2000 | Schreffler |
| 5,592,054 A | 1/1997 | Nerone et al. | 6,016,038 A | 1/2000 | Mueller et al. |
| 5,600,199 A | 2/1997 | Martin, Sr. et al. | 6,018,237 A | 1/2000 | Havel |
| 5,607,227 A | 3/1997 | Yasumoto et al. | 6,019,493 A | 2/2000 | Kuo et al. |
| 5,608,290 A | 3/1997 | Hutchisson et al. | 6,020,825 A | 2/2000 | Chansky et al. |
| 5,614,788 A | 3/1997 | Mullins et al. | 6,025,550 A | 2/2000 | Kato |
| 5,621,282 A | 4/1997 | Haskell | 6,028,694 A | 2/2000 | Schmidt |
| 5,621,603 A | 4/1997 | Adamec et al. | 6,030,099 A | 2/2000 | McDermott |
| 5,621,662 A | 4/1997 | Humphries et al. | 6,031,343 A | 2/2000 | Recknagel et al. |
| 5,622,423 A | 4/1997 | Lee | D422,737 S | 4/2000 | Orozco |
| 5,633,629 A | 5/1997 | Hochstein | 6,056,420 A | 5/2000 | Wilson et al. |
| 5,634,711 A | 6/1997 | Kennedy et al. | 6,068,383 A | 5/2000 | Robertson et al. |
| 5,640,061 A | 6/1997 | Bornhorst et al. | 6,069,597 A | 5/2000 | Hansen |
| 5,640,141 A | 6/1997 | Myllymaki | 6,072,280 A | 6/2000 | Allen |
| 5,642,129 A | 6/1997 | Zavracky et al. | 6,084,359 A | 7/2000 | Hetzel et al. |
| 5,655,830 A | 8/1997 | Ruskouski | 6,086,220 A | 7/2000 | Lash et al. |
| 5,656,935 A | 8/1997 | Havel | 6,091,200 A | 7/2000 | Lenz |
| 5,661,645 A | 8/1997 | Hochstein | 6,092,915 A | 7/2000 | Rensch |
| 5,673,059 A | 9/1997 | Zavracky et al. | 6,095,661 A | 8/2000 | Lebens et al. |
| 5,682,103 A | 10/1997 | Burrell | 6,097,352 A | 8/2000 | Zavracky et al. |
| 5,688,042 A | 11/1997 | Madadi et al. | 6,116,748 A | 9/2000 | George |
| 5,697,695 A | 12/1997 | Lin et al. | 6,121,875 A | 9/2000 | Hamm et al. |
| 5,701,058 A | 12/1997 | Roth | 6,127,783 A | 10/2000 | Pashley et al. |
| 5,712,650 A | 1/1998 | Barlow | 6,132,072 A | 10/2000 | Turnbull et al. |
| 5,721,471 A | 2/1998 | Begemann et al. | 6,135,604 A | 10/2000 | Lin |
| 5,725,148 A | 3/1998 | Hartman | 6,139,174 A | 10/2000 | Butterworth |
| 5,726,535 A | 3/1998 | Yan | 6,149,283 A | 11/2000 | Conway et al. |
| 5,731,759 A | 3/1998 | Finucan | 6,150,774 A | 11/2000 | Mueller et al. |
| 5,734,590 A | 3/1998 | Tebbe | 6,151,529 A | 11/2000 | Batko |
| 5,751,118 A | 5/1998 | Mortimer | 6,158,882 A | 12/2000 | Bischoff, Jr. |
| 5,752,766 A | 5/1998 | Bailey et al. | 6,166,496 A | 12/2000 | Lys et al. |
| 5,765,940 A | 6/1998 | Levy et al. | 6,175,201 B1 | 1/2001 | Sid |
| 5,769,527 A | 6/1998 | Taylor et al. | 6,175,220 B1 | 1/2001 | Billig et al. |
| 5,784,006 A | 7/1998 | Hochstein | 6,181,126 B1 | 1/2001 | Havel |
| 5,785,227 A | 7/1998 | Akiba | 6,183,086 B1 | 2/2001 | Neubert |
| 5,790,329 A | 8/1998 | Klaus et al. | 6,183,104 B1 | 2/2001 | Ferrara |
| 5,803,579 A | 9/1998 | Turnbull et al. | 6,184,628 B1 | 2/2001 | Ruthenberg |
| 5,803,580 A | 9/1998 | Tseng | 6,196,471 B1 | 3/2001 | Ruthenberg |
| 5,803,729 A | 9/1998 | Tsimerman | 6,203,180 B1 | 3/2001 | Fleischmann |
| 5,806,965 A | 9/1998 | Deese | 6,211,626 B1 | 4/2001 | Lys et al. |
| 5,808,689 A | 9/1998 | Small | 6,215,409 B1 | 4/2001 | Blach |
| 5,810,463 A | 9/1998 | Kawahara et al. | 6,217,190 B1 | 4/2001 | Altman et al. |
| 5,812,105 A | 9/1998 | Van de Ven | 6,219,239 B1 | 4/2001 | Mellberg et al. |
| 5,813,751 A | 9/1998 | Shaffer | 6,227,679 B1 | 5/2001 | Zhang et al. |
| 5,813,753 A | 9/1998 | Vriens et al. | 6,238,075 B1 | 5/2001 | Dealey, Jr. et al. |
| 5,821,695 A | 10/1998 | Vilanilam et al. | 6,241,359 B1 | 6/2001 | Lin |
| 5,825,051 A | 10/1998 | Bauer et al. | 6,250,774 B1 | 6/2001 | Begemann et al. |
| 5,828,178 A | 10/1998 | York et al. | 6,252,350 B1 | 6/2001 | Alvarez |
| 5,836,676 A | 11/1998 | Ando et al. | 6,252,358 B1 | 6/2001 | Xydis et al. |

| | | | | | | |
|---|---|---|---|---|---|---|
| 6,268,600 B1 | 7/2001 | Nakamura et al. | | 6,659,622 B2 | 12/2003 | Katogi et al. |
| 6,273,338 B1 | 8/2001 | White | | 6,660,935 B2 | 12/2003 | Southard et al. |
| 6,275,397 B1 | 8/2001 | McClain | | 6,666,689 B1 | 12/2003 | Savage, Jr. |
| 6,283,612 B1 | 9/2001 | Hunter | | 6,667,623 B2 | 12/2003 | Bourgault et al. |
| 6,292,901 B1 | 9/2001 | Lys et al. | | 6,674,096 B2 | 1/2004 | Sommers |
| 6,293,684 B1 | 9/2001 | Riblett | | 6,676,284 B1 | 1/2004 | Wynne Willson |
| 6,297,724 B1 | 10/2001 | Bryans et al. | | 6,679,621 B2 | 1/2004 | West et al. |
| 6,305,109 B1 | 10/2001 | Lee | | 6,681,154 B2 | 1/2004 | Nierlich et al. |
| 6,305,821 B1 | 10/2001 | Hsieh et al. | | 6,682,205 B2 | 1/2004 | Lin |
| 6,307,331 B1 | 10/2001 | Bonasia et al. | | 6,683,419 B2 | 1/2004 | Kriparos |
| 6,310,590 B1 | 10/2001 | Havel | | 6,700,136 B2 | 3/2004 | Guida |
| 6,323,832 B1 | 11/2001 | Nishizawa et al. | | 6,712,486 B1 | 3/2004 | Popovich et al. |
| 6,325,651 B1 | 12/2001 | Nishihara et al. | | 6,717,376 B2 | 4/2004 | Lys et al. |
| 6,334,699 B1 | 1/2002 | Gladnick | | 6,717,526 B2 | 4/2004 | Martineau et al. |
| 6,340,868 B1 | 1/2002 | Lys et al. | | 6,720,745 B2 | 4/2004 | Lys et al. |
| 6,354,714 B1 | 3/2002 | Rhodes | | 6,726,348 B2 | 4/2004 | Gloisten |
| 6,361,186 B1 | 3/2002 | Slayden | | 6,741,324 B1 | 5/2004 | Kim |
| 6,369,525 B1 | 4/2002 | Chang et al. | | D491,678 S | 6/2004 | Piepgras |
| 6,371,637 B1 | 4/2002 | Atchinson et al. | | D492,042 S | 6/2004 | Piepgras |
| 6,373,733 B1 | 4/2002 | Wu et al. | | 6,744,223 B2 | 6/2004 | Laflamme et al. |
| 6,379,022 B1 | 4/2002 | Amerson et al. | | 6,748,299 B1 | 6/2004 | Motoyama |
| D457,667 S | 5/2002 | Piepgras et al. | | 6,762,562 B2 | 7/2004 | Leong |
| D457,669 S | 5/2002 | Piepgras et al. | | 6,768,047 B2 * | 7/2004 | Chang et al. .................. 136/244 |
| D457,974 S | 5/2002 | Piepgras et al. | | 6,774,584 B2 | 8/2004 | Lys et al. |
| 6,388,393 B1 | 5/2002 | Illingworth | | 6,777,891 B2 | 8/2004 | Lys et al. |
| 6,394,623 B1 | 5/2002 | Tsui | | 6,781,329 B2 | 8/2004 | Mueller et al. |
| D458,395 S | 6/2002 | Piepgras et al. | | 6,787,999 B2 | 9/2004 | Stimac et al. |
| 6,400,096 B1 | 6/2002 | Wells et al. | | 6,788,000 B2 | 9/2004 | Appelberg et al. |
| 6,404,131 B1 | 6/2002 | Kawano et al. | | 6,788,011 B2 | 9/2004 | Mueller et al. |
| 6,411,022 B1 | 6/2002 | Machida | | 6,791,840 B2 | 9/2004 | Chun |
| 6,422,716 B2 | 7/2002 | Henrici et al. | | 6,796,680 B1 | 9/2004 | Showers et al. |
| 6,428,189 B1 | 8/2002 | Hochstein | | 6,801,003 B2 | 10/2004 | Schanberger et al. |
| D463,610 S | 9/2002 | Piepgras et al. | | 6,806,659 B1 | 10/2004 | Mueller et al. |
| 6,445,139 B1 | 9/2002 | Marshall et al. | | 6,814,470 B2 | 11/2004 | Rizkin et al. |
| 6,448,550 B1 | 9/2002 | Nishimura | | 6,815,724 B2 | 11/2004 | Dry |
| 6,448,716 B1 | 9/2002 | Hutchison | | 6,846,094 B2 | 1/2005 | Luk |
| 6,459,919 B1 | 10/2002 | Lys et al. | | 6,851,816 B2 | 2/2005 | Wu et al. |
| 6,469,457 B2 | 10/2002 | Callahan | | 6,851,832 B2 | 2/2005 | Tieszen |
| 6,471,388 B1 | 10/2002 | Marsh | | 6,853,151 B2 | 2/2005 | Leong et al. |
| 6,472,823 B2 | 10/2002 | Yen | | 6,853,563 B1 | 2/2005 | Yang et al. |
| 6,473,002 B1 | 10/2002 | Hutchison | | 6,857,924 B2 | 2/2005 | Fu et al. |
| D468,035 S | 12/2002 | Blanc et al. | | 6,860,628 B2 | 3/2005 | Robertson et al. |
| 6,488,392 B1 | 12/2002 | Lu | | 6,866,401 B2 | 3/2005 | Sommers et al. |
| 6,495,964 B1 | 12/2002 | Muthu et al. | | 6,869,204 B2 | 3/2005 | Morgan et al. |
| 6,527,411 B1 | 3/2003 | Sayers | | 6,871,981 B2 | 3/2005 | Alexanderson et al. |
| 6,528,954 B1 | 3/2003 | Lys et al. | | 6,874,924 B1 | 4/2005 | Hulse et al. |
| 6,528,958 B2 | 3/2003 | Hulshof et al. | | 6,879,883 B1 | 4/2005 | Motoyama |
| 6,538,375 B1 | 3/2003 | Duggal et al. | | 6,882,111 B2 | 4/2005 | Kan et al. |
| 6,548,967 B1 | 4/2003 | Dowling et al. | | 6,883,929 B2 | 4/2005 | Dowling |
| 6,568,834 B1 | 5/2003 | Scianna | | 6,883,934 B2 | 4/2005 | Kawakami et al. |
| 6,573,536 B1 | 6/2003 | Dry | | 6,888,322 B2 | 5/2005 | Dowling et al. |
| 6,577,072 B2 | 6/2003 | Saito et al. | | 6,897,624 B2 | 5/2005 | Lys et al. |
| 6,577,080 B2 | 6/2003 | Lys et al. | | 6,909,239 B2 | 6/2005 | Gauna |
| 6,577,512 B2 | 6/2003 | Tripathi et al. | | 6,909,921 B1 | 6/2005 | Bilger |
| 6,577,794 B1 | 6/2003 | Currie et al. | | 6,918,580 B2 | 7/2005 | Obregon et al. |
| 6,578,979 B2 | 6/2003 | Truttmann-Battig | | 6,918,680 B2 | 7/2005 | Seeberger |
| 6,582,103 B1 | 6/2003 | Popovich et al. | | 6,921,181 B2 | 7/2005 | Yen |
| 6,583,550 B2 | 6/2003 | Iwasa et al. | | 6,936,968 B2 | 8/2005 | Cross et al. |
| 6,583,573 B2 | 6/2003 | Bierman | | 6,936,978 B2 | 8/2005 | Morgan et al. |
| 6,585,393 B1 | 7/2003 | Brandes et al. | | 6,940,230 B2 | 9/2005 | Myron et al. |
| 6,586,890 B2 | 7/2003 | Min et al. | | 6,948,829 B2 | 9/2005 | Verdes et al. |
| 6,590,343 B2 | 7/2003 | Pederson | | 6,957,905 B1 | 10/2005 | Pritchard et al. |
| 6,592,238 B2 | 7/2003 | Cleaver et al. | | 6,963,175 B2 | 11/2005 | Archenhold et al. |
| 6,596,977 B2 | 7/2003 | Muthu et al. | | 6,964,501 B2 | 11/2005 | Ryan |
| 6,598,996 B1 | 7/2003 | Lodhie | | 6,965,197 B2 | 11/2005 | Tyan et al. |
| 6,608,453 B2 | 8/2003 | Morgan et al. | | 6,965,205 B2 | 11/2005 | Piepgras et al. |
| 6,608,614 B1 | 8/2003 | Johnson | | 6,967,448 B2 | 11/2005 | Morgan et al. |
| 6,609,804 B2 | 8/2003 | Nolan et al. | | 6,969,179 B2 | 11/2005 | Sloan et al. |
| 6,612,712 B2 | 9/2003 | Nepil | | 6,969,186 B2 | 11/2005 | Sonderegger et al. |
| 6,612,717 B2 | 9/2003 | Yen | | 6,969,954 B2 | 11/2005 | Lys |
| 6,621,222 B1 | 9/2003 | Hong | | 6,975,079 B2 | 12/2005 | Lys et al. |
| 6,623,151 B2 | 9/2003 | Pederson | | 6,979,097 B2 | 12/2005 | Elam et al. |
| 6,624,597 B2 | 9/2003 | Dowling et al. | | 6,982,518 B2 | 1/2006 | Chou et al. |
| D481,484 S | 10/2003 | Cuevas et al. | | 6,995,681 B2 | 2/2006 | Pederson |
| 6,634,770 B2 | 10/2003 | Cao | | 6,997,576 B1 | 2/2006 | Lodhie et al. |
| 6,634,779 B2 | 10/2003 | Reed | | 7,004,603 B2 | 2/2006 | Knight |
| 6,636,003 B2 | 10/2003 | Rahm et al. | | D518,218 S | 3/2006 | Roberge et al. |
| 6,639,349 B1 | 10/2003 | Bahadur | | 7,008,079 B2 | 3/2006 | Smith |
| 6,641,284 B2 | 11/2003 | Stopa et al. | | 7,014,336 B1 | 3/2006 | Ducharme et al. |

| | | |
|---|---|---|
| 7,015,650 B2 | 3/2006 | McGrath |
| 7,018,063 B2 | 3/2006 | Michael et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |
| 7,049,761 B2 | 5/2006 | Timmermans et al. |
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 | 6/2006 | Leong et al. |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |
| 7,088,904 B2 | 8/2006 | Ryan, Jr. |
| 7,102,902 B1 | 9/2006 | Brown et al. |
| 7,113,541 B1 | 9/2006 | Lys et al. |
| 7,114,830 B2 | 10/2006 | Robertson et al. |
| 7,114,834 B2 | 10/2006 | Rivas et al. |
| 7,118,262 B2 | 10/2006 | Negley |
| 7,119,503 B2 | 10/2006 | Kemper |
| 7,121,679 B2 | 10/2006 | Fujimoto |
| 7,122,976 B1 | 10/2006 | Null et al. |
| 7,128,442 B2 | 10/2006 | Lee et al. |
| 7,128,454 B2 | 10/2006 | Kim et al. |
| D532,532 S | 11/2006 | Maxik |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,144,135 B2 | 12/2006 | Martin et al. |
| 7,153,002 B2 | 12/2006 | Kim et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,164,110 B2 | 1/2007 | Pitigoi-Aron et al. |
| 7,164,235 B2 | 1/2007 | Ito et al. |
| 7,165,863 B1 | 1/2007 | Thomas et al. |
| 7,165,866 B2 | 1/2007 | Li |
| 7,167,777 B2 | 1/2007 | Budike, Jr. |
| 7,168,843 B2 | 1/2007 | Striebel |
| D536,468 S | 2/2007 | Crosby |
| 7,178,941 B2 | 2/2007 | Roberge et al. |
| 7,180,252 B2 | 2/2007 | Lys et al. |
| D538,950 S | 3/2007 | Maxik |
| D538,952 S | 3/2007 | Maxik et al. |
| D538,962 S | 3/2007 | Elliott |
| 7,186,003 B2 | 3/2007 | Dowling et al. |
| 7,186,005 B2 | 3/2007 | Hulse |
| 7,187,141 B2 | 3/2007 | Mueller et al. |
| 7,190,126 B1 | 3/2007 | Paton |
| 7,192,154 B2 | 3/2007 | Becker |
| 7,198,387 B1 | 4/2007 | Gloisten et al. |
| 7,201,491 B2 | 4/2007 | Bayat et al. |
| 7,201,497 B2 | 4/2007 | Weaver, Jr. et al. |
| 7,202,613 B2 | 4/2007 | Morgan et al. |
| 7,204,615 B2 | 4/2007 | Arik et al. |
| 7,204,622 B2 | 4/2007 | Dowling et al. |
| 7,207,696 B1 | 4/2007 | Lin |
| 7,210,818 B2 | 5/2007 | Luk et al. |
| 7,210,957 B2 | 5/2007 | Mrakovich et al. |
| 7,211,959 B1 | 5/2007 | Chou |
| 7,213,934 B2 | 5/2007 | Zarian et al. |
| 7,217,004 B2 | 5/2007 | Park et al. |
| 7,217,012 B2 | 5/2007 | Southard et al. |
| 7,217,022 B2 | 5/2007 | Ruffin |
| 7,218,056 B1 | 5/2007 | Harwood |
| 7,218,238 B2 | 5/2007 | Right et al. |
| 7,220,015 B2 | 5/2007 | Dowling |
| 7,220,018 B2 | 5/2007 | Crabb et al. |
| 7,221,104 B2 | 5/2007 | Lys et al. |
| 7,221,110 B2 | 5/2007 | Sears et al. |
| 7,224,000 B2 | 5/2007 | Aanegola et al. |
| 7,226,189 B2 | 6/2007 | Lee et al. |
| 7,228,052 B1 | 6/2007 | Lin |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,237,924 B2 | 7/2007 | Martineau et al. |
| 7,237,925 B2 | 7/2007 | Mayer et al. |
| 7,239,532 B1 | 7/2007 | Hsu et al. |
| 7,241,038 B2 | 7/2007 | Naniwa et al. |
| 7,242,152 B2 | 7/2007 | Dowling et al. |
| 7,246,926 B2 | 7/2007 | Harwood |
| 7,246,931 B2 | 7/2007 | Hsieh et al. |
| 7,248,239 B2 | 7/2007 | Dowling et al. |
| 7,249,269 B1 | 7/2007 | Motoyama |
| 7,249,865 B2 | 7/2007 | Robertson |
| D548,868 S | 8/2007 | Roberge et al. |
| 7,252,408 B2 | 8/2007 | Mazzochette et al. |
| 7,253,566 B2 | 8/2007 | Lys et al. |
| 7,255,457 B2 | 8/2007 | Ducharme et al. |
| 7,255,460 B2 | 8/2007 | Lee |
| 7,256,554 B2 | 8/2007 | Lys |
| 7,258,458 B2 | 8/2007 | Mochiachvili et al. |
| 7,258,467 B2 | 8/2007 | Saccomanno et al. |
| 7,259,528 B2 | 8/2007 | Pilz |
| 7,262,439 B2 | 8/2007 | Setlur et al. |
| 7,264,372 B2 | 9/2007 | Maglica |
| 7,267,467 B2 | 9/2007 | Wu et al. |
| 7,270,443 B2 | 9/2007 | Kurtz et al. |
| 7,271,794 B1 | 9/2007 | Cheng et al. |
| 7,273,300 B2 | 9/2007 | Mrakovich |
| 7,274,045 B2 | 9/2007 | Chandran et al. |
| 7,274,160 B2 | 9/2007 | Mueller et al. |
| D553,267 S | 10/2007 | Yuen |
| 7,285,801 B2 | 10/2007 | Eliashevich et al. |
| 7,288,902 B1 | 10/2007 | Melanson |
| 7,288,904 B2 * | 10/2007 | Numeroli et al. ............. 315/312 |
| 7,296,912 B2 | 11/2007 | Beauchamp |
| 7,300,184 B2 | 11/2007 | Ichikawa et al. |
| 7,300,192 B2 | 11/2007 | Mueller et al. |
| D556,937 S | 12/2007 | Ly |
| D557,854 S | 12/2007 | Lewis |
| 7,303,300 B2 | 12/2007 | Dowling et al. |
| 7,306,353 B2 | 12/2007 | Popovich et al. |
| 7,307,391 B2 | 12/2007 | Shan |
| 7,308,296 B2 | 12/2007 | Lys et al. |
| 7,309,965 B2 | 12/2007 | Dowling et al. |
| 7,318,658 B2 | 1/2008 | Wang et al. |
| 7,319,244 B2 | 1/2008 | Liu et al. |
| 7,319,246 B2 | 1/2008 | Soules et al. |
| 7,321,191 B2 | 1/2008 | Setlur et al. |
| 7,326,964 B2 | 2/2008 | Lim et al. |
| 7,327,281 B2 | 2/2008 | Hutchison |
| 7,329,031 B2 | 2/2008 | Liaw et al. |
| D563,589 S | 3/2008 | Hariri et al. |
| 7,345,320 B2 | 3/2008 | Dahm |
| 7,348,604 B2 | 3/2008 | Matheson |
| 7,350,936 B2 | 4/2008 | Ducharme et al. |
| 7,350,952 B2 | 4/2008 | Nishigaki |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,358,929 B2 | 4/2008 | Mueller et al. |
| 7,374,327 B2 | 5/2008 | Schexnaider |
| 7,378,805 B2 | 5/2008 | Oh et al. |
| 7,385,359 B2 | 6/2008 | Dowling et al. |
| 7,391,159 B2 | 6/2008 | Harwood |
| 7,396,146 B2 | 7/2008 | Wang |
| 7,401,935 B2 | 7/2008 | VanderSchuit |
| 7,401,945 B2 | 7/2008 | Zhang |
| 7,427,840 B2 | 9/2008 | Morgan et al. |
| 7,429,117 B2 | 9/2008 | Pohlert et al. |
| 7,434,964 B1 | 10/2008 | Zheng et al. |
| 7,438,441 B2 | 10/2008 | Sun et al. |
| D580,089 S | 11/2008 | Ly et al. |

| | | | | | | |
|---|---|---|---|---|---|---|
| D581,556 S | 11/2008 | To et al. | | 2004/0003545 A1 | 1/2004 | Gillespie |
| 7,449,847 B2 | 11/2008 | Schanberger et al. | | 2004/0012959 A1 | 1/2004 | Robertson et al. |
| D582,577 S | 12/2008 | Yuen | | 2004/0036006 A1 | 2/2004 | Dowling |
| D584,428 S | 1/2009 | Li et al. | | 2004/0037088 A1 | 2/2004 | English et al. |
| 7,476,002 B2 | 1/2009 | Wolf et al. | | 2004/0052076 A1 | 3/2004 | Mueller et al. |
| 7,476,004 B2 | 1/2009 | Chan | | 2004/0062041 A1 | 4/2004 | Cross et al. |
| 7,478,924 B2 | 1/2009 | Robertson | | 2004/0075572 A1 | 4/2004 | Buschmann et al. |
| D586,484 S | 2/2009 | Liu et al. | | 2004/0080960 A1 | 4/2004 | Wu |
| D586,928 S | 2/2009 | Liu et al. | | 2004/0090191 A1 | 5/2004 | Mueller et al. |
| 7,490,957 B2 | 2/2009 | Leong et al. | | 2004/0090787 A1 | 5/2004 | Dowling et al. |
| 7,497,596 B2 | 3/2009 | Ge | | 2004/0105261 A1 | 6/2004 | Ducharme et al. |
| 7,507,001 B2 | 3/2009 | Kit | | 2004/0105264 A1 | 6/2004 | Spero |
| 7,510,299 B2 | 3/2009 | Timmermans et al. | | 2004/0113568 A1 | 6/2004 | Dowling et al. |
| 7,520,635 B2 | 4/2009 | Wolf et al. | | 2004/0116039 A1 | 6/2004 | Mueller et al. |
| 7,521,872 B2 | 4/2009 | Bruning | | 2004/0124782 A1 | 7/2004 | Yu |
| 7,524,089 B2 | 4/2009 | Park | | 2004/0130909 A1 | 7/2004 | Mueller et al. |
| D592,766 S | 5/2009 | Zhu et al. | | 2004/0141321 A1 | 7/2004 | Dowling et al. |
| D593,223 S | 5/2009 | Komar | | 2004/0155609 A1 | 8/2004 | Lys et al. |
| 7,534,002 B2 | 5/2009 | Yamaguchi et al. | | 2004/0160199 A1 | 8/2004 | Morgan et al. |
| 7,549,769 B2 | 6/2009 | Kim et al. | | 2004/0178751 A1 | 9/2004 | Mueller et al. |
| 7,556,396 B2 | 7/2009 | Kuo et al. | | 2004/0189218 A1 | 9/2004 | Leong et al. |
| 7,572,030 B2 | 8/2009 | Booth et al. | | 2004/0189262 A1 | 9/2004 | McGrath |
| 7,575,339 B2 | 8/2009 | Hung | | 2004/0212320 A1 | 10/2004 | Dowling et al. |
| 7,579,786 B2 | 8/2009 | Soos | | 2004/0212321 A1 | 10/2004 | Lys et al. |
| 7,602,559 B2 | 10/2009 | Jang et al. | | 2004/0212993 A1 | 10/2004 | Morgan et al. |
| 7,619,366 B2 | 11/2009 | Diederiks | | 2004/0223328 A1 | 11/2004 | Lee et al. |
| 7,635,201 B2 | 12/2009 | Deng | | 2004/0240890 A1 | 12/2004 | Lys et al. |
| D612,528 S | 3/2010 | McGrath et al. | | 2004/0257007 A1 | 12/2004 | Lys et al. |
| 7,690,813 B2 | 4/2010 | Kanamori et al. | | 2005/0013133 A1 | 1/2005 | Yeh |
| 7,712,918 B2 | 5/2010 | Siemiet et al. | | 2005/0024877 A1 | 2/2005 | Frederick |
| 7,828,471 B2 | 11/2010 | Lin | | 2005/0030744 A1 | 2/2005 | Ducharme et al. |
| 8,013,472 B2 * | 9/2011 | Adest et al. ............... 307/77 | | 2005/0035728 A1 | 2/2005 | Schanberger et al. |
| 2001/0033488 A1 | 10/2001 | Chliwnyj et al. | | 2005/0036300 A1 | 2/2005 | Dowling et al. |
| 2001/0045803 A1 | 11/2001 | Cencur | | 2005/0040774 A1 | 2/2005 | Mueller et al. |
| 2002/0038157 A1 | 3/2002 | Dowling et al. | | 2005/0041161 A1 | 2/2005 | Dowling et al. |
| 2002/0044066 A1 | 4/2002 | Dowling et al. | | 2005/0041424 A1 | 2/2005 | Ducharme |
| 2002/0047569 A1 | 4/2002 | Dowling et al. | | 2005/0043907 A1 | 2/2005 | Eckel et al. |
| 2002/0047624 A1 | 4/2002 | Stam et al. | | 2005/0044617 A1 | 3/2005 | Mueller et al. |
| 2002/0047628 A1 | 4/2002 | Morgan et al. | | 2005/0047132 A1 | 3/2005 | Dowling et al. |
| 2002/0048169 A1 | 4/2002 | Dowling et al. | | 2005/0047134 A1 | 3/2005 | Mueller et al. |
| 2002/0057061 A1 | 5/2002 | Mueller et al. | | 2005/0062440 A1 | 3/2005 | Lys et al. |
| 2002/0060526 A1 | 5/2002 | Timmermans et al. | | 2005/0063194 A1 | 3/2005 | Lys et al. |
| 2002/0070688 A1 | 6/2002 | Dowling et al. | | 2005/0078477 A1 | 4/2005 | Lo |
| 2002/0074559 A1 | 6/2002 | Dowling et al. | | 2005/0099824 A1 | 5/2005 | Dowling et al. |
| 2002/0078221 A1 | 6/2002 | Blackwell et al. | | 2005/0107694 A1 | 5/2005 | Jansen et al. |
| 2002/0101197 A1 | 8/2002 | Lys et al. | | 2005/0110384 A1 | 5/2005 | Peterson |
| 2002/0113555 A1 | 8/2002 | Lys et al. | | 2005/0116667 A1 | 6/2005 | Mueller et al. |
| 2002/0130627 A1 | 9/2002 | Morgan et al. | | 2005/0128751 A1 | 6/2005 | Roberge et al. |
| 2002/0145394 A1 | 10/2002 | Morgan et al. | | 2005/0141225 A1 | 6/2005 | Striebel |
| 2002/0145869 A1 | 10/2002 | Dowling | | 2005/0151489 A1 | 7/2005 | Lys et al. |
| 2002/0152045 A1 | 10/2002 | Dowling et al. | | 2005/0151663 A1 | 7/2005 | Tanguay |
| 2002/0152298 A1 | 10/2002 | Kikta et al. | | 2005/0154494 A1 | 7/2005 | Ahmed |
| 2002/0153851 A1 | 10/2002 | Morgan et al. | | 2005/0162093 A1 | 7/2005 | Timmermans et al. |
| 2002/0158583 A1 | 10/2002 | Lys et al. | | 2005/0174473 A1 | 8/2005 | Morgan et al. |
| 2002/0163316 A1 | 11/2002 | Lys et al. | | 2005/0174780 A1 | 8/2005 | Park |
| 2002/0171365 A1 | 11/2002 | Morgan et al. | | 2005/0184667 A1 | 8/2005 | Sturman et al. |
| 2002/0171377 A1 | 11/2002 | Mueller et al. | | 2005/0201112 A1 | 9/2005 | Machi et al. |
| 2002/0171378 A1 | 11/2002 | Morgan et al. | | 2005/0206529 A1 | 9/2005 | St.-Germain |
| 2002/0176259 A1 | 11/2002 | Ducharme | | 2005/0213320 A1 | 9/2005 | Kazuhiro et al. |
| 2002/0179816 A1 | 12/2002 | Haines et al. | | 2005/0213352 A1 | 9/2005 | Lys |
| 2002/0195975 A1 | 12/2002 | Schanberger et al. | | 2005/0213353 A1 | 9/2005 | Lys |
| 2003/0011538 A1 | 1/2003 | Lys et al. | | 2005/0218838 A1 | 10/2005 | Lys |
| 2003/0028260 A1 | 2/2003 | Blackwell | | 2005/0218870 A1 | 10/2005 | Lys |
| 2003/0031015 A1 | 2/2003 | Ishibashi | | 2005/0219860 A1 | 10/2005 | Schexnaider |
| 2003/0057884 A1 | 3/2003 | Dowling et al. | | 2005/0219872 A1 | 10/2005 | Lys |
| 2003/0057886 A1 | 3/2003 | Lys et al. | | 2005/0225979 A1 | 10/2005 | Robertson et al. |
| 2003/0057887 A1 | 3/2003 | Dowling et al. | | 2005/0231133 A1 | 10/2005 | Lys |
| 2003/0057890 A1 | 3/2003 | Lys et al. | | 2005/0236029 A1 | 10/2005 | Dowling |
| 2003/0076281 A1 | 4/2003 | Morgan et al. | | 2005/0236998 A1 | 10/2005 | Mueller et al. |
| 2003/0085710 A1 | 5/2003 | Bourgault et al. | | 2005/0248299 A1 | 11/2005 | Chemel et al. |
| 2003/0095404 A1 | 5/2003 | Becks et al. | | 2005/0253533 A1 | 11/2005 | Lys et al. |
| 2003/0100837 A1 | 5/2003 | Lys et al. | | 2005/0259424 A1 | 11/2005 | Zampini, II et al. |
| 2003/0102810 A1 | 6/2003 | Cross et al. | | 2005/0265019 A1 | 12/2005 | Sommers et al. |
| 2003/0133292 A1 | 7/2003 | Mueller et al. | | 2005/0275626 A1 | 12/2005 | Mueller et al. |
| 2003/0137258 A1 | 7/2003 | Piepgras et al. | | 2005/0276051 A1 | 12/2005 | Caudle et al. |
| 2003/0185005 A1 | 10/2003 | Sommers et al. | | 2005/0276053 A1 | 12/2005 | Nortrup et al. |
| 2003/0185014 A1 | 10/2003 | Gloisten | | 2005/0276064 A1 | 12/2005 | Wu et al. |
| 2003/0189412 A1 | 10/2003 | Cunningham | | 2005/0285547 A1 | 12/2005 | Piepgras et al. |
| 2003/0222587 A1 | 12/2003 | Dowling, Jr. et al. | | 2006/0002110 A1 | 1/2006 | Dowling et al. |

| | | |
|---|---|---|
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0050509 A9 | 3/2006 | Dowling et al. |
| 2006/0050514 A1 | 3/2006 | Opolka |
| 2006/0076908 A1 | 4/2006 | Morgan et al. |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0126338 A1 | 6/2006 | Mighetto |
| 2006/0132061 A1 | 6/2006 | McCormick et al. |
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0197661 A1 | 9/2006 | Tracy et al. |
| 2006/0198128 A1 | 9/2006 | Piepgras et al. |
| 2006/0208667 A1 | 9/2006 | Lys et al. |
| 2006/0221606 A1 | 10/2006 | Dowling et al. |
| 2006/0221619 A1 | 10/2006 | Nishigaki |
| 2006/0232974 A1 | 10/2006 | Lee et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0064419 A1 | 3/2007 | Gandhi |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0115658 A1 | 5/2007 | Mueller et al. |
| 2007/0115665 A1 | 5/2007 | Mueller et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0147046 A1 | 6/2007 | Arik et al. |
| 2007/0152797 A1 | 7/2007 | Chemel et al. |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0205712 A1 | 9/2007 | Radkov et al. |
| 2007/0206375 A1 | 9/2007 | Piepgras et al. |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247842 A1 | 10/2007 | Zampini et al. |
| 2007/0247847 A1 | 10/2007 | Villard |
| 2007/0247851 A1 | 10/2007 | Villard |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0037245 A1 | 2/2008 | Chan |
| 2008/0037284 A1 | 2/2008 | Rudisill |
| 2008/0062680 A1 | 3/2008 | Timmermans et al. |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094837 A1 | 4/2008 | Dobbins et al. |
| 2008/0129211 A1 | 6/2008 | Lin et al. |
| 2008/0130267 A1 | 6/2008 | Dowling et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0186704 A1 | 8/2008 | Chou et al. |
| 2008/0192436 A1 | 8/2008 | Peng et al. |
| 2008/0211419 A1 | 9/2008 | Garrity |
| 2008/0224629 A1 | 9/2008 | Melanson |
| 2008/0224636 A1 | 9/2008 | Melanson |
| 2008/0253125 A1 | 10/2008 | Kang et al. |
| 2008/0258647 A1 | 10/2008 | Scianna |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0315784 A1 | 12/2008 | Tseng |
| 2009/0002995 A1 | 1/2009 | Lee et al. |
| 2009/0016063 A1 | 1/2009 | Hu |
| 2009/0046473 A1 | 2/2009 | Tsai et al. |
| 2009/0052186 A1 | 2/2009 | Xue |
| 2009/0067182 A1 | 3/2009 | Hsu et al. |
| 2009/0086492 A1 | 4/2009 | Meyer |
| 2009/0091938 A1 | 4/2009 | Jacobson et al. |
| 2009/0140285 A1 | 6/2009 | Lin et al. |
| 2009/0175041 A1 | 7/2009 | Yuen et al. |
| 2009/0185373 A1 | 7/2009 | Grajcar |
| 2009/0195186 A1 | 8/2009 | Guest et al. |
| 2009/0196034 A1 | 8/2009 | Gherardini et al. |
| 2009/0213588 A1 | 8/2009 | Manes |
| 2009/0273926 A1 | 11/2009 | Deng |
| 2009/0303720 A1 | 12/2009 | McGrath |
| 2009/0316408 A1 | 12/2009 | Villard |
| 2010/0008085 A1 | 1/2010 | Ivey et al. |
| 2010/0019689 A1 | 1/2010 | Shan |
| 2010/0027259 A1 | 2/2010 | Simon et al. |
| 2010/0033964 A1 | 2/2010 | Choi et al. |
| 2010/0096998 A1 | 4/2010 | Beers |
| 2010/0103664 A1 | 4/2010 | Simon et al. |
| 2010/0109558 A1 | 5/2010 | Chew |

FOREIGN PATENT DOCUMENTS

| | | |
|---|---|---|
| CN | 2869556 Y | 2/2007 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 A2 | 1/1995 |
| EP | 0432848 B1 | 4/1995 |
| EP | 0403001 B1 | 8/1995 |
| EP | 0525876 B1 | 5/1996 |
| EP | 0714556 B1 | 1/1999 |
| EP | 0458408 B1 | 9/1999 |
| EP | 0578302 B1 | 9/1999 |
| EP | 0723701 B1 | 1/2000 |
| EP | 0787419 B1 | 5/2001 |
| EP | 1195740 A2 | 4/2002 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1142452 B1 | 3/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 B1 | 6/2007 |
| EP | 0922305 B1 | 8/2007 |
| EP | 0922306 B1 | 8/2007 |
| EP | 1194918 B1 | 8/2007 |
| EP | 1048085 B1 | 11/2007 |
| EP | 1763650 B1 | 12/2007 |
| EP | 1776722 B1 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1157428 B1 | 9/2008 |
| EP | 1000522 B1 | 12/2008 |
| EP | 1502483 B1 | 12/2008 |
| EP | 1576858 B1 | 12/2008 |
| EP | 1646092 B1 | 1/2009 |
| EP | 1337784 B1 | 6/2009 |
| GB | 2215024 A | 9/1989 |
| GB | 2324901 A | 11/1998 |
| JP | 6-54103 U | 7/1994 |
| JP | H6-54103 | 7/1994 |
| JP | 7-249467 | 9/1995 |
| JP | 08-162677 | 6/1996 |
| JP | 11-135274 A | 5/1999 |
| JP | 2001-238272 A | 8/2001 |
| JP | 2002-141555 A | 5/2002 |
| JP | 3098271 U | 2/2004 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006-507641 A | 3/2006 |
| JP | 3139714 U | 2/2008 |
| JP | 2008-258124 A | 10/2008 |
| KR | 10-2004-0008244 A | 1/2004 |
| KR | 20-0430022 Y1 | 11/2006 |
| KR | 10-0781652 B1 | 12/2007 |
| TW | M337036 | 7/2008 |
| WO | 9906759 A1 | 2/1999 |
| WO | 99/10867 A1 | 3/1999 |
| WO | 99/31560 A2 | 6/1999 |
| WO | 9945312 A1 | 9/1999 |
| WO | 00/01067 A2 | 1/2000 |
| WO | 02/25842 A2 | 3/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/099780 A2 | 12/2002 |
| WO | 03/026358 A1 | 3/2003 |
| WO | 03/055273 A2 | 7/2003 |
| WO | 03/067934 A2 | 8/2003 |
| WO | 03/090890 A1 | 11/2003 |
| WO | 03/096761 A1 | 11/2003 |
| WO | 2004/021747 A2 | 3/2004 |
| WO | 2004/023850 A2 | 3/2004 |
| WO | 2004/032572 A2 | 4/2004 |
| WO | 2004/100624 A2 | 11/2004 |
| WO | 2005031860 A2 | 4/2005 |
| WO | 2005/052751 A2 | 6/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 20061023149 A2 | 3/2006 |
| WO | 2006044328 A1 | 4/2006 |
| WO | 2006056120 A1 | 6/2006 |
| WO | 2006/093889 A2 | 9/2006 |
| WO | 2006/127666 A2 | 11/2006 |
| WO | 2006/127785 A2 | 11/2006 |
| WO | 2006/133272 A2 | 12/2006 |
| WO | 2006137686 A1 | 12/2006 |
| WO | 2007/081674 A1 | 7/2007 |
| WO | 2007/094810 A2 | 8/2007 |
| WO | 2007090292 A1 | 8/2007 |
| WO | 9957945 A1 | 9/2009 |
| WO | 2010/030509 A2 | 3/2010 |

OTHER PUBLICATIONS

Written Opinion and International Search Report of the International Search Authority Jul. 30, 2010 from the corresponding International Application No. PCT/US20101021448 filed Jan. 20, 2010.

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.

Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.

Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.

Telecite Products & Services—Display Options, [online], [retrieved on Jan. 13, 2000] Retrieved from Telecite Web page using Internet <URL: http://www.telecite.com/en/products/options en.htm>.

Traffic Signal Products—Transportation Products Group, [online], [retrieved on Jan. 13, 2000] Retrieved from the Dialight Web Page using Internet <URL: http://www.dialight.com/trans.htm>.

LED Lights, Replacement LED lamps for any incandescent light, [online], [retrieved on Jan. 13, 2000] Retrieved from LED Lights Web Page using Internet <URL: http://www.ledlights.com/replac.htm>.

LEDTRONICS, LEDTRONICS Catalog, 1996, p. 10, LEDTRONICS, Torrance, California.

Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.

Phason Electronic Control Systems, Light Level Controller (LLC) case study. Nov. 30, 2004. 3 pages, Phason Inc., Winnipeg, Manitoba, Canada.

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.

D.N.A.—III, [online], [retrieved Mar. 10, 2009] Retrieved from the PLC Lighting Web Page using Internet <URL: http://www.plclighting.com/product_info.php?cPath=1&products_id=92>.

E20116-18 Larmes Collection, [online], [retrieved on Jul. 20, 2010] Retrieved from ET2 Contemporary Lighting using Internet <URL: http://www.et2online.com/proddetail.aspx?ItemID=E20116-18>.

E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.

E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.

E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.

E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.

Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.

Sensor Switch, nLight Lighting Control System, [online], [retrieved on Jan. 11, 2008] Retrieved from Sensor Switch web page using Internet <URL: http://www.sensorswitch.com>.

Six Strategies, [online], [retrieved on Jan. 11, 2008] Retrieved from Encelium Technologies Inc. Web Page using Internet <URL: http://www.encelium.com/products/strategies.html>.

Lawrence Berkeley National Laboratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.

Best Practice Guide—Commercial Office Buildings—Central HVAC System. [online], [Retrieved on Jan. 17, 2008] Retrieved from FlexYour Power Organization web page using Internet <URL: http://www.fypower.org/bpg/module.html?b=offices&m+Central HVAC Systems&s=Contr . . . >.

Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.

* cited by examiner

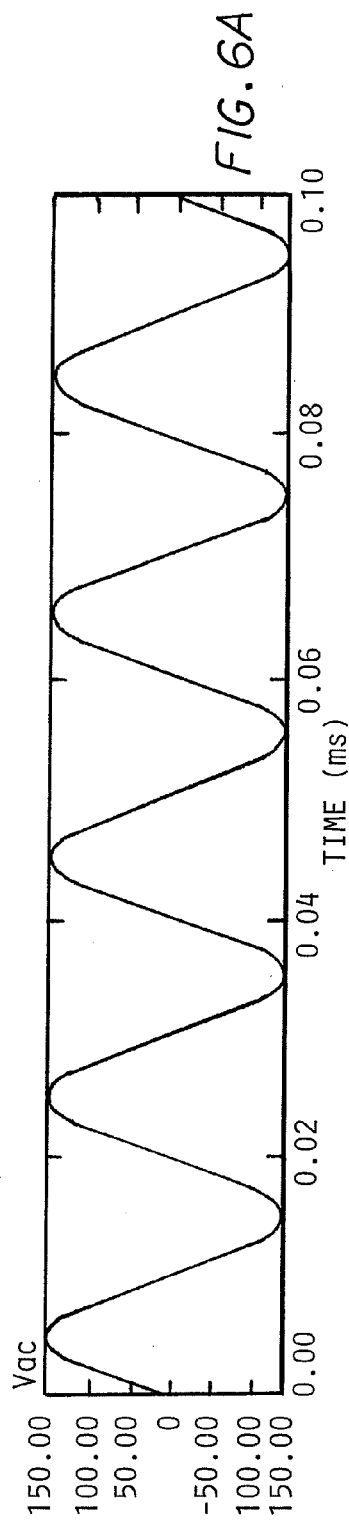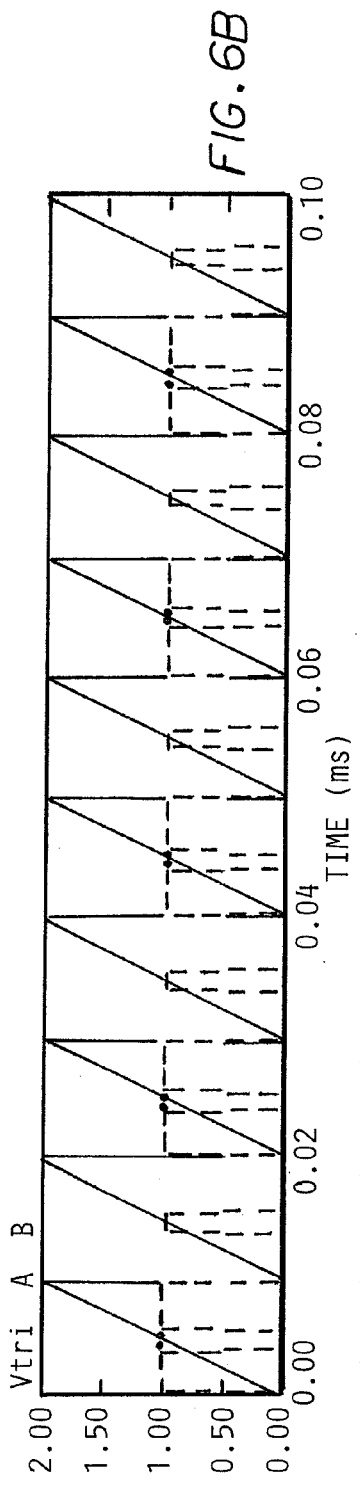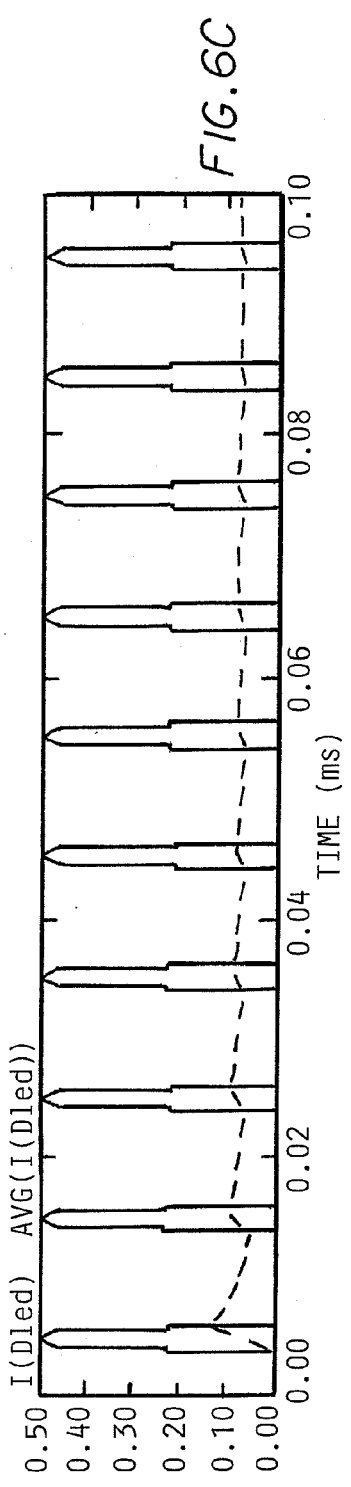

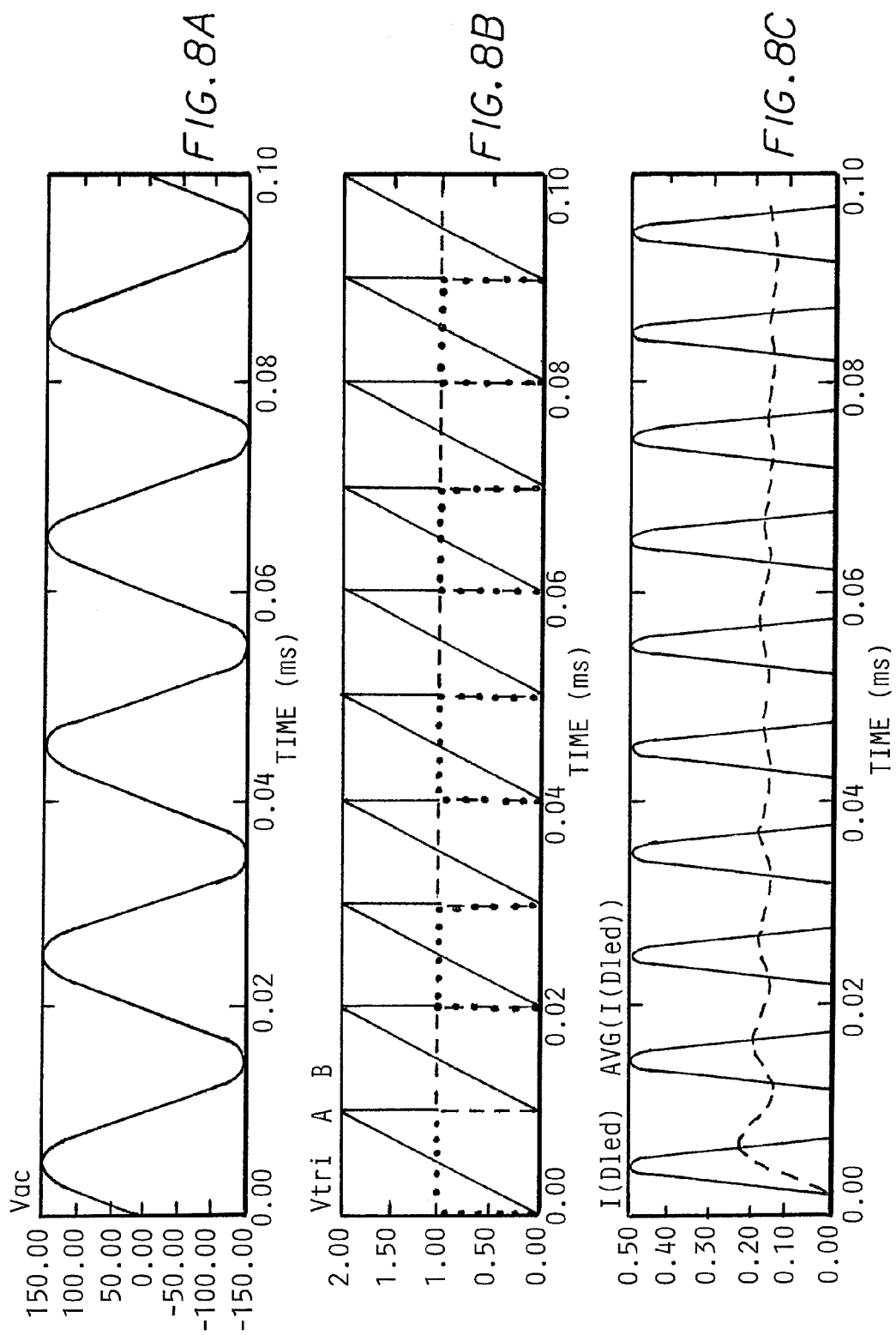

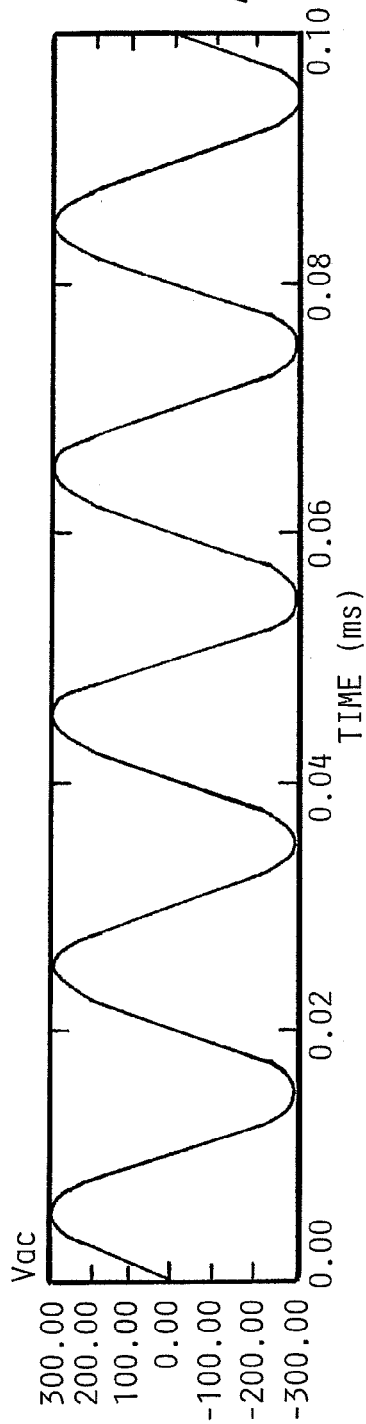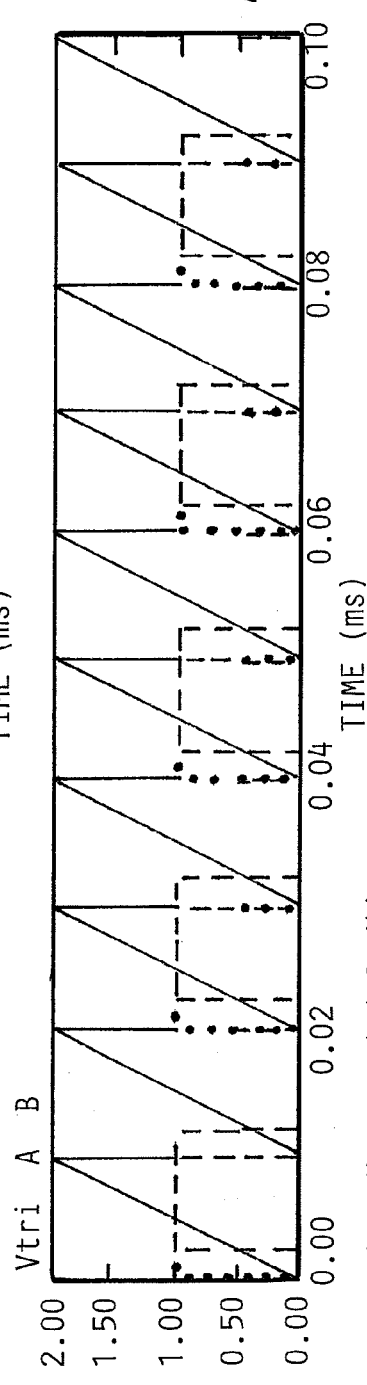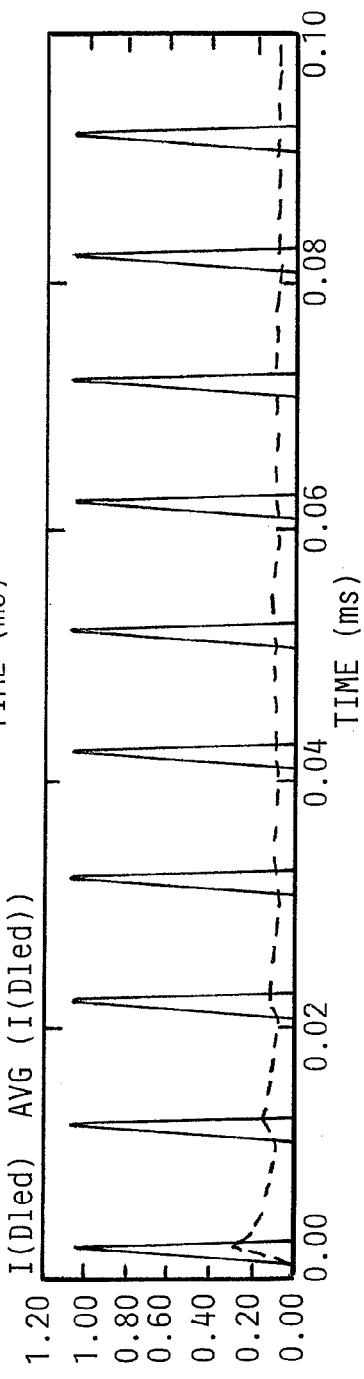

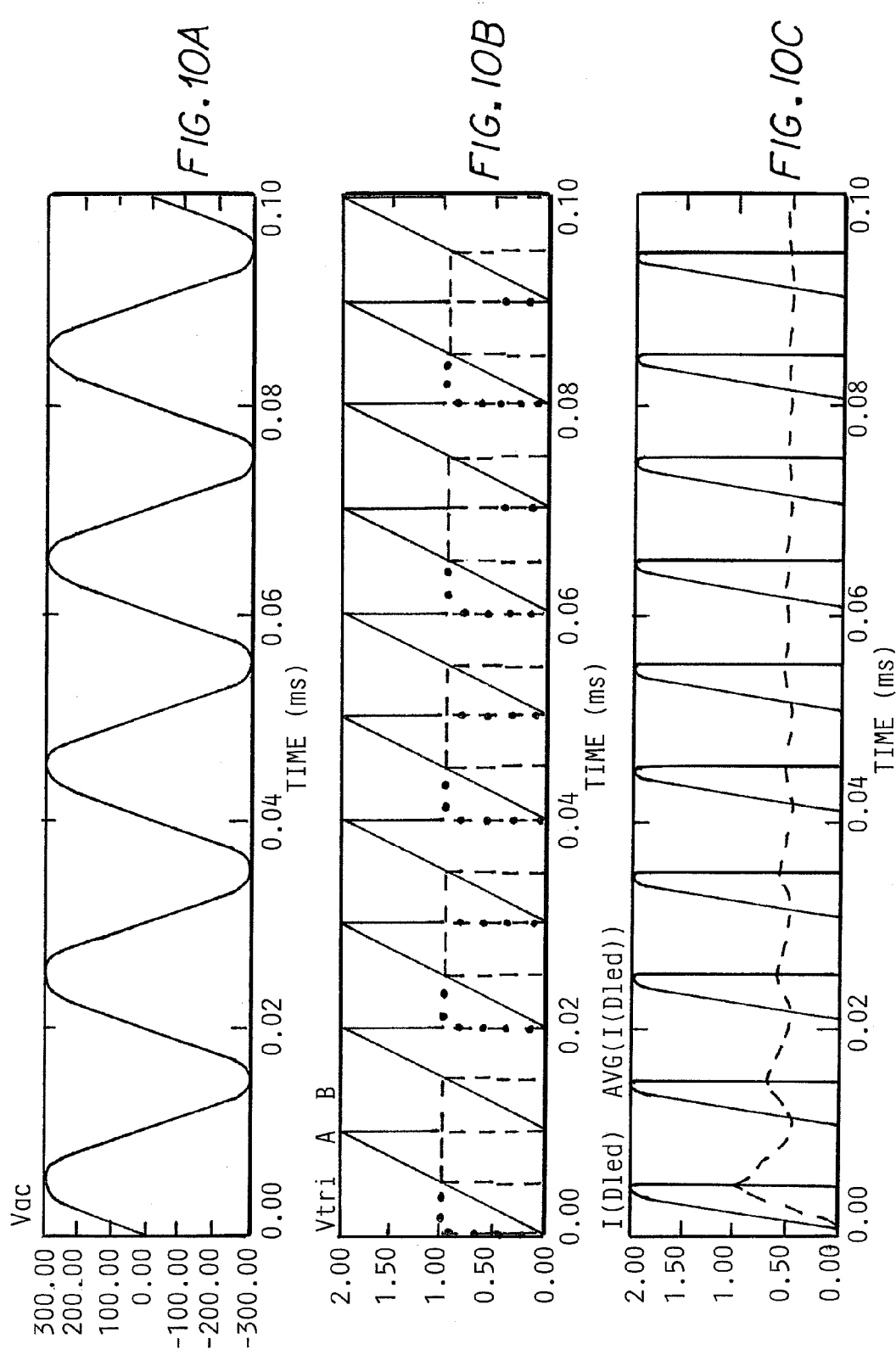

US 8,362,710 B2

DIRECT AC-TO-DC CONVERTER FOR PASSIVE COMPONENT MINIMIZATION AND UNIVERSAL OPERATION OF LED ARRAYS

CROSS-REFERENCE TO RELATED APPLICATIONS

This application claims priority to U.S. Provisional Patent Application Ser. No. 61/146,041, filed Jan. 21, 2009, which is hereby incorporated by reference in its entirety.

TECHNICAL FIELD

The present invention relates in general to conversion of an alternating current (AC) to direct current (DC), and more specifically, to single stage power conversion of an AC-to-DC signal for operation of LED arrays.

BACKGROUND

Incandescent light bulbs are gradually being replaced by light-emitting diodes (LEDs) in many applications. LEDs have many advantages over traditional incandescent lamps in that they have longer operational life, reduced power consumption, greater durability and increased design flexibility.

Despite these advantages, at present LEDs are not used in all applications. LEDs commonly operate on a supply of DC. Accordingly, many applications that use LEDs require conversion of an AC power supply to a DC power supply. For example, U.S. Pat. No. 7,049,761 assigned to the assignee of this invention, discloses a power supply circuit that includes a rectifier circuit and a PWM switching circuit. The rectifier converts AC power to DC power and the PWM switching circuit receives the DC power and pulse-width modulates the DC power to supply an LED array. Known converters are not practical for use with some LED applications because of their size and excessive cost. Passive components such as capacitors and inductors within known converters become larger as operating voltages increase thereby increasing the overall size and cost of the LED device.

BRIEF SUMMARY

Embodiments of a power converter circuit for a LED lighting device are disclosed herein. In one such embodiment, the power converter includes a pair of input terminals adapted to be connected to a signal source and at least one LED. The power converter also includes a first circuit adapted to supply current to the at least one LED. The first circuit includes a first bi-directional switch and a second bi-directional switch. The first bi-directional switch is connected between one input terminal and one side of the at least one LED, and the second bi-directional switch is connected between the other side of the at least one LED and the other input terminal. Current flows through the at least one LED in a predetermined direction when both of the first and second bi-directional switches are conducting in a first direction. The power converter also includes a second circuit adapted to supply current to the at least one LED. The second circuit includes a third bi-directional switch and a fourth bi-directional switch. The third bi-directional switch is connected between the other input terminal and the one side of the at least one LED, and the fourth bi-directional switch connected between the one input terminal and the other side of the at least one LED. Current flows through the at least one LED in the predetermined direction when both of the third and fourth bi-directional switches are conducting in a second direction.

Embodiments of a method of supplying power to a LED lighting device through a power converter including first, second, third and fourth bi-directional switches and first and second control circuits are also disclosed herein. In one such embodiment, the method includes, receiving a current signal, generating a first control signal through the first control circuit for the first and third bi-directional switches and generating a second control signal through the second control circuit for the second and fourth bi-directional switches. The method also includes supplying the current signal to the at least one LED in a first predetermined direction when one of the first and second bi-directional switches are conducting in a first direction and the third and fourth bi-directional switches are conducting in a second direction in response to the first and second control signals.

These and other embodiments are described in additional detail hereinafter.

BRIEF DESCRIPTION OF THE DRAWING

The various features, advantages and other uses of the present invention will become more apparent by referring to the following detailed description and drawing in which:

FIG. 6A is a circuit simulation waveform of an AC link voltage of the AC-to-DC converter of FIG. 1;

FIG. 6B is a circuit simulation waveform of the carrier signal of FIG. 5 and the phase signals A and B of FIG. 2 at a center conduction angle of 30 degrees;

FIG. 6C is a circuit simulation waveform of instantaneous current and the average current in the LED array of the AC-to-DC converter of FIG. 1;

FIG. 8A is a circuit simulation waveform of the AC link voltage of the AC-to-DC converter of FIG. 1;

FIG. 8B is a circuit simulation waveform of the carrier signal of FIG. 5 and the phase signals A and B of FIG. 2 at a center conduction angle of 180 degrees;

FIG. 8C is a circuit simulation waveform of instantaneous current and the average current in the LED array of the AC-to-DC converter of FIG. 1;

FIG. 9A is a circuit simulation waveform of the AC link voltage of the AC-to-DC converter of FIG. 1;

FIG. 9B is a circuit simulation waveform of the carrier signal of FIG. 5 and the phase signals A and B of FIG. 2 at a edge conduction angle of 90 degrees;

FIG. 9C is a circuit simulation waveform of instantaneous current and the average current in the LED array of the AC-to-DC converter of FIG. 1;

FIG. 10A is a circuit simulation waveform of the AC link voltage of the AC-to-DC converter of FIG. 1;

FIG. 10B is a circuit simulation waveform of the carrier signal of FIG. 5 and the phase signals A and B of FIG. 2 at a edge conduction angle of 180 degrees;

FIG. 10C is a circuit simulation waveform of instantaneous current and the average current in the LED array of the AC-to-DC converter of FIG. 1.

DETAILED DESCRIPTION

Figure 1:
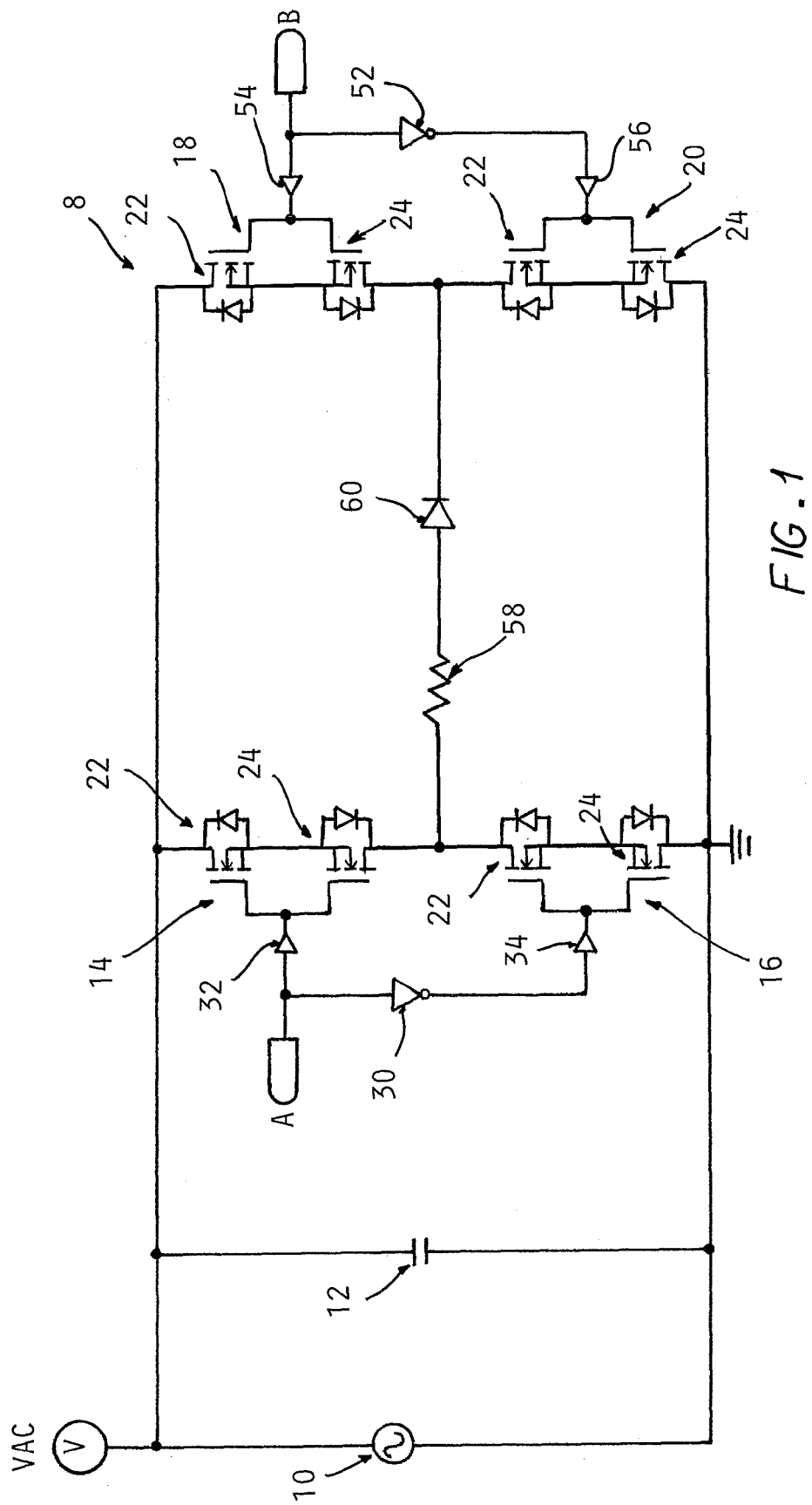
FIG. 1 is a circuit schematic of an AC-to-DC converter in accordance with an embodiment of the invention.

FIG. 1 shows a circuit diagram of an exemplary AC-to-DC converter 8 according to one embodiment of the invention. A signal source 10 provides an AC signal. An AC link capacitor 12 is connected in parallel to the signal source 10. A first set of bi-directional voltage and current switches 14, 16 is used to rectify the positive half-cycle of the signal source 10, and switches 14, 16 are connected in parallel with the AC link capacitor 12. A second set of bi-directional voltage and current switches 18, 20 is used to rectify the negative half-cycle (if any) of the signal source 10, and switches 18, 20 are connected in parallel with the switches 14, 16. A current limiting resistor 58 has one end connected to a common point between switches 14, 16 and has the other end connected to a load 60. Load 60 is shown as a single diode. However, load 60 represents a plurality of LEDs that are typically arranged in an array. Load 60 is also connected to a common point between switches 18, 20. The first set of switches 14, 16 is controlled by control circuitry 114 shown in FIG. 2, and the second set of switches 18, 20 is controlled by control circuitry 116 shown in FIG. 3. Control circuitry 114 and control circuitry 116 are discussed in more detail hereinafter.

AC-to-DC converter 8 is called universal since signal source 10 can be generated from a 110/220 VAC single phase direct connect, a high frequency ballast, a low frequency ballast, a DC source or the like. As switching devices 14, 16, 18 and 20 are switched from a non-conducting state to a conducting state, such as to provide power to load 60, large voltage spikes may occur that can cause damage to switches 14, 16, 18 and 20 and to other circuitry. Therefore, capacitor 12, coupled to signal source 10, is used as a snubber filter for parasitic inductance related to the interconnection of bi-directional voltage and current switches 14, 16, 18 and 20. Capacitor 12 is preferably a small capacitor that can sustain the high voltages necessary to protect the circuitry. By way of example only, capacitor 12 may be a value of 0.01 µF. Other capacitor values or snubbing circuits for reducing the parasitic inductive effects can also be used depending on the size of load 60 and ratings of the circuitry components. AC-to-DC converter 8 is called direct since it is a single stage power conversion topology. Benefits of the single stage power conversion topology will be discussed in more detail hereinafter.

Still referring to FIG. 1, the power stage of AC-to-DC converter 8 includes the first set of bi-directional voltage and current switches 14, 16 and the second set of bi-directional voltage and current switches 18, 20. Each switch 14, 16, 18 and 20 has two n-channel enhancement-mode MOSFETs 22, 24. Switching devices 22, 24 may also be any suitable controllable switching device such as a BJT, IGBT, standard FET, etc., that can be controlled through application of a control signal.

The source terminals of respective MOSFETs 22, 24 are coupled, while MOSFETs 22, 24 are coupled by their drain terminals to signal source 10 on one end and to resistor 58 and load 60 on the other end. Coupled in this manner, each MOSFET 22, 24 pair effectively forms diodes pointing in opposing directions. Accordingly, current cannot flow through switches 14, 16, 18 and 20 when MOSFETs 22, 24 are OFF. In contrast, when MOSFETs 22, 24 are ON, current can flow through switches 14, 16, 18 and 20 in both directions.

Control circuitry 114, 116, mentioned previously, control the gates of MOSFET switches 22, 24. The first control circuit 114, supplying a control signal A which is discussed in more detail hereinafter, controls the gates of MOSFETs 22, 24 of bi-directional switch 14 as well as the gates of MOSFETs 22, 24 of bi-directional switch 16. The output of control circuit 114 is connected to the input of a buffer amplifier 32, the output of which provides a gate drive signal to bi-directional switch 14. The output of control circuit 114 is also connected to the input of an inverter 30, the output of which is connected to the input of a buffer amplifier 34 and provides a gate drive signal to bi-directional switch 16. Through the use of the inverter 30, when bi-directional switch 16 is ON, bi-directional switch 14 will be OFF, and when bi-directional switch 16 is OFF, bi-directional switch 14 will be ON.

The second gate control circuit 116, supplying a control signal B which is discussed in more detail hereinafter, controls the gates of MOSFETs 22, 24 of bi-directional switch 18 as well as the gates of MOSFETs 22, 24 of bi-directional switch 20. The output of control circuit 116 is connected to the input of a buffer amplifier 54, the output of which provides a gate drive signal to the bi-directional switch 18. The output of control circuit 116 is also connected to the input of an inverter 52, the output of which is connected to the input of a buffer amplifier 56 and provides a gate drive signal to bi-directional switch 20. Through the use of the inverter 52, when bi-directional switch 18 is ON, bi-directional switch 20 will be OFF, and when bi-directional switch 18 is OFF, bi-directional switch 20 will be ON.

Figure 2:
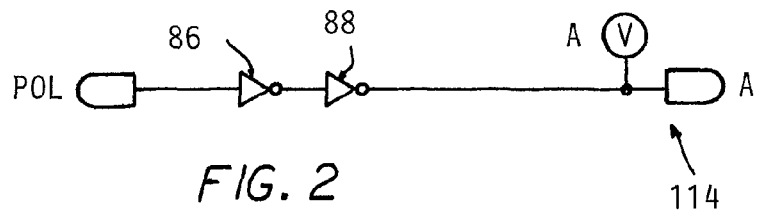
FIG. 2 is a schematic of the gate drive logic used to sequence phase A in the AC-to-DC converter of FIG. 1.
Figure 3:
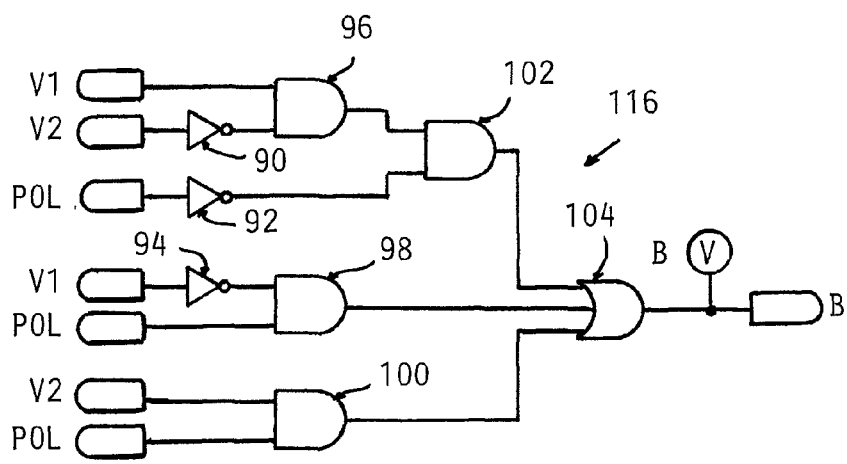
FIG. 3 is a schematic of the gate drive logic used to sequence phase B in the AC-to-DC converter of FIG. 1.

FIGS. 2 and 3 illustrate one embodiment of control circuitry that drives the gates of bi-directional switches 14, 16, 18 and 20. The control logic in FIGS. 2 and 3 is an illustration of the functionality of the circuitry and is not limited to logic gates as shown. The functionality of control circuits 110, 112, 114, and 116 shown in FIGS. 2-5, respectively, may be implemented by a hardware and/or software means, including but not limited to an integrated circuit, programmed microcontroller, analog switches, a programmable logic device, etc., that can provide a suitable gate drive through application of a control signal according to the teachings herein.

FIG. 2 illustrates gate drive control logic 114 that drives the gates of bi-directional switches 14, 16. Signal POL, which indicates the polarity of signal source 10 and is discussed in more detail hereinafter, is generated from the AC link polarity detection circuit 110 shown in FIG. 4. Signal POL is connected to two inverters 86, 88 connected in series, the output of which provides the gate drive signals to bi-directional switches 14, 16. As previously mentioned, this gate drive signal is designated as signal A.

FIG. 3 illustrates gate drive control logic 116 that drives the gates of bi-directional switches 18, 20. Signal POL is generated from AC link polarity detection circuit 110 shown in FIG. 4 and signals V1 and V2 are generated from conduction angle and carrier signal comparison circuit 112 shown in FIG. 5 and will be discussed in more detail hereinafter. Signals POL, V1 and V2 are the inputs used to generate the gate drive signal for switches 18, 20. As previously mentioned, this gate drive signal is designated as signal B.

Still referring to FIG. 3, signal V1 is connected to the first input of an AND gate 96. Signal V2 is connected to an inverter 90, which provides the second input of AND gate 96. The output of AND gate 96 is connected to the first input of an AND gate 102. Signal POL is connected to an inverter 92, which provides the second input of AND gate 102. The output of AND gate 102 provides the first of three inputs to an OR gate 104. Signal V1 is connected to an inverter 94, which provides the first input of an AND gate 98. Signal POL is connected to the second input of AND gate 98, which provides the second of three inputs to OR gate 104. Signal V2 and signal POL are connected to the inputs of an AND gate 100, which provides the third of three inputs to OR gate 104. The output of OR gate 104 is designated as signal B.

Figure 4:
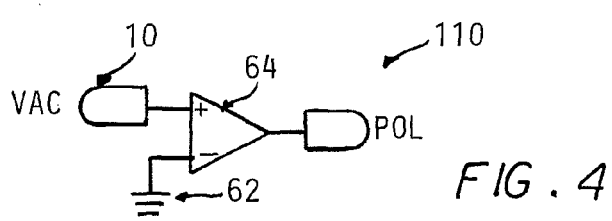
FIG. 4 is a circuit schematic of an AC link polarity detection circuit used in the gate drive logic of FIGS. 2 and 3.

FIG. 4 illustrates circuitry of AC link polarity detection circuit 110. Polarity circuit 110 provides an indication of the polarity (positive or negative) by finding the difference of signal source 10 and a ground 62 through a comparator 64. The output of comparator 64 is designated as signal POL. As previously discussed, signal POL is input into gate drive control logic 114, 116. Polarity circuit 110 may also be any other suitable circuitry that determines the polarity of the signal source 10.

Figure 5:
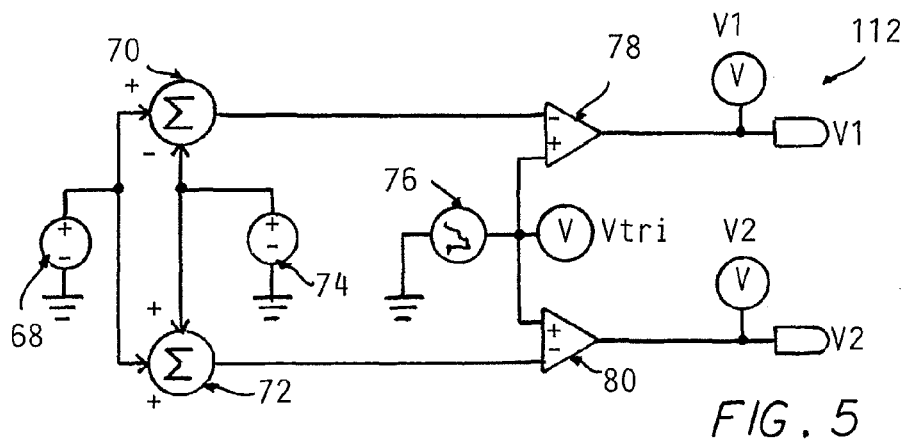
FIG. 5 is a circuit schematic for a conduction angle and carrier signal comparison circuit used in the gate drive logic of FIG. 3.

FIG. 5 illustrates circuitry of conduction angle and carrier signal comparison circuit 112. A conduction width reference value 74 is subtracted from a constant voltage source 68 using a subtracter 70. The output (difference) of subtracter 70 is connected to the negative input terminal of comparator 78. A synchronized triangle carrier signal 76 is the input to the positive terminal of comparator 78. Comparator 78 compares carrier signal 76 and the output of subtracter 70 and generates signal V1. As previously discussed, signal V1 is input into gate drive control logic 116.

With continued reference to FIG. 5, simultaneously with the above-mentioned sequence, conduction width reference value 74 is summed with constant voltage source 68 using an adder 72. The output (sum) of adder 72 is connected to the negative input terminal of comparator 80. Carrier signal 76 is the input to the positive terminal of comparator 80. Comparator 80 compares carrier signal 76 and the output of the adder 72 and generates signal V2. As previously discussed, signal V2 is input into gate drive control logic 116.

Preferably, the values in conduction angle and carrier signal comparison circuit 112 are chosen to use a center conduction angle technique. The center conduction angle technique causes conduction to be centered at the peaks of the most negative and most positive portions of signal source 10 and will be discussed in more detail in FIGS. 6A, 7A and 8A. By way of example only, this technique can be realized by setting constant voltage source 68 to a value of 1 volt, controlling conduction width reference value 74 to a range of 0-1 volts and generating carrier signal 76 with an amplitude of 2 volts.

Conduction angle width reference value 74 can be varied by a control to provide desired regulation to load 60 and to achieve rated excitation and dimming. The control may be external or internal to the system and may be a rotatable knob, a slide adjuster or any other suitable control.

The control value is proportional to the conduction angle width reference value 74. By way of example only, the control can be varied from a value of 0-180 degrees. If conduction width reference value 74 outputted a range of 0-1 volts, a control value of 0 degrees would cause conduction angle width reference value 74 to output 0 volts whereas a control value of 180 degrees would cause conduction angle width reference value 74 to output 1 volt. Similarly, control values between 0 degrees and 180 degrees would be proportional to the output voltage range of conduction angle width reference value 74 (e.g. 90 degrees=0.5 volts). Thus, a smaller control value would create shorter conduction pulses causing load 60 to be dimmer whereas a larger control value would create greater conduction pulses causing load 60 to be brighter.

In operation, the AC-to-DC converter 8 can control the current through load 60. As mentioned, load 60 may be a single LED, any interconnection of series or parallel LEDs or an LED array. The converter 8 according to this embodiment will function in the following manner when signals V1, V2, POL, A and B have the following values:

| V1 | V2 | POL | | A | B |
|----|----|-----|---|---|---|
| 0  | 0  | 0   | | 0 | 0 |
| 0  | 0  | 1   | | 1 | 1 |
| 0  | 1  | 0   | | 0 | 0 |
| 0  | 1  | 1   | | 1 | 1 |
| 1  | 0  | 0   | | 0 | 1 |
| 1  | 0  | 1   | | 1 | 0 |
| 1  | 1  | 0   | | 0 | 0 |
| 1  | 1  | 1   | | 1 | 1 |

Referring back to FIG. 1, there are two cases in which the load 60 is supplied by a forward-operating current. Under the first case, the bi-directional switches 14, 20 are ON when the polarity of the signal source 10 is positive. As discussed above, the bi-directional switches 16, 18 are OFF because the inverters 30, 52 do not permit the bi-directional switches 14, 16 to be ON concurrently with each other. Similarly, the inverters 30, 52 do not permit the bi-directional switches 18, 20 to be ON concurrently with each other. As seen from the truth table, the first case operates when V1=1, V2=0, and POL=1. These values will drive control signals to A=1 and B=0 so that bi-directional switches 14, 20 will be in a conducting state. The positive current will flow from signal source 10, through bi-directional switch 14, through resistor 58, through load 60, through bi-directional switch 20 and back to signal source 10.

Similarly, under the second case, bi-directional switches 16, 18 are ON when the polarity of signal source 10 is negative. Additionally, this means that bi-directional switches 14, are OFF. As seen from the truth table, the second case operates when V1=1, V2=0, and POL=0. These values will drive control signals to A=0 and B=1 so that bi-directional switches 16, 18 will be in a conducting state. The negative current will flow from signal source 10, through bi-directional switch 16, through resistor 58, through load 60, through bi-directional switch 18 and back to signal source 10.

In all other instances, the AC-to-DC converter 8 will be short-circuited since either both bi-directional switches 14 and 16 will be ON or both bi-directional switches 18 and 20 will be ON. It is also within the scope of the invention to implement control circuitry that causes load 60 to be supplied by a reverse-operating current. In a first case, the control circuitry would drive control signals to A=1 and B=0 so that bi-directional switches 14, 20 will be in a conducting state when the polarity of the signal source is negative. In a second case, the control circuitry would drive control signals to A=0 and B=1 so that bi-directional switches 14, 20 will be in a conducting state when the polarity of the signal source is positive.

Referring to the simulation waveforms of FIGS. 6A, 7A, 8A, 9A and 10A, the circuit simulation waveforms represent the voltage from a 60 Hz AC signal source 10 at a 150V peak. The AC-to-DC converter 8 can be used with a wide range of voltages and frequencies.

Figure 7A:
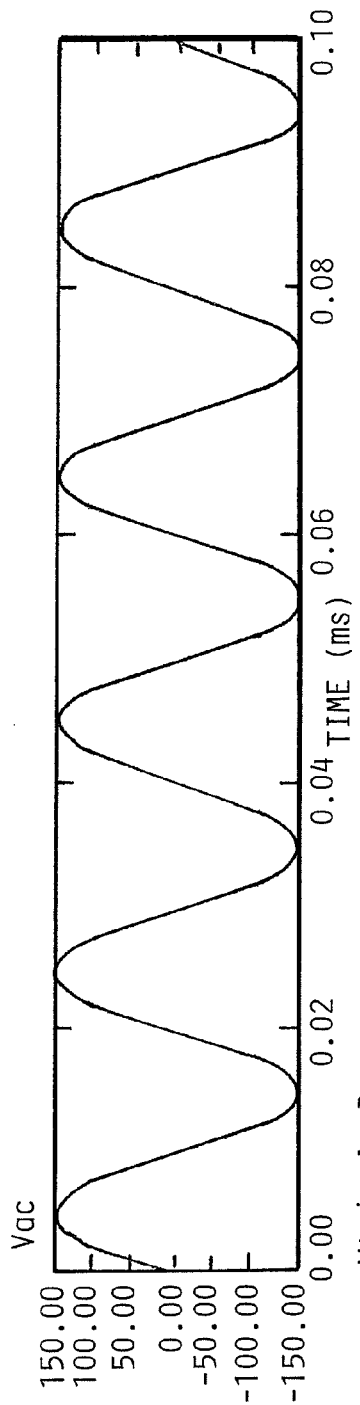
FIG. 7A is a circuit simulation waveform of the AC link voltage of the AC-to-DC converter of FIG. 1.
Figure 7B:
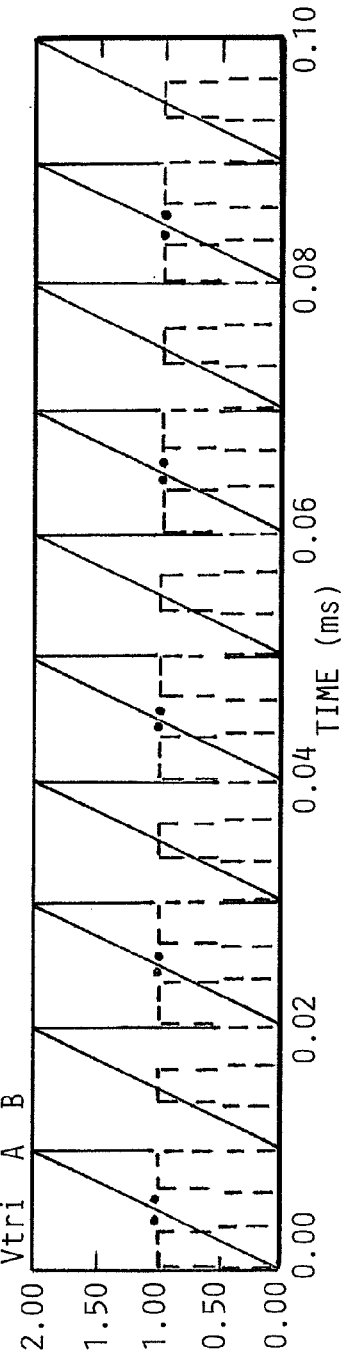
FIG. 7B is a circuit simulation waveform of the carrier signal of FIG. 5 and the phase signals A and B of FIG. 2 at a center conduction angle of 60 degrees.

Referring to FIGS. 6B, 7B and 8B, synchronized carrier signal 76 is graphed (shown by a solid line), as well as the gate drive signals A (shown by a dotted line) and B (shown by a dashed line) using the center conduction angle technique. As previously mentioned, the center conduction angle technique causes conduction to be centered at the peaks of the most negative and most positive portion of the sine waveform as shown in FIGS. 6A, 7A and 8A. FIG. 6B represents the control circuitry operating at a center conduction angle of 30 degrees; FIG. 7B represents the control circuitry operating at a center conduction angle of 60 degrees; and FIG. 8B represents the control circuitry operating at a center conduction angle of 180 degrees.

In contrast, FIGS. 9B and 10B show synchronized carrier signal 76 (shown by a solid line) and gate drive signals A (shown by a dotted line) and B (shown by a dashed line) using a leading-edge conduction angle technique since conduction begins at zero-crossing of the signal source 10. FIG. 9B represents the control circuitry operating at a edge conduction angle of 45 degrees; and FIG. 10B represents the control circuitry operating at a edge conduction angle of 90 degrees.

Figure 7C:
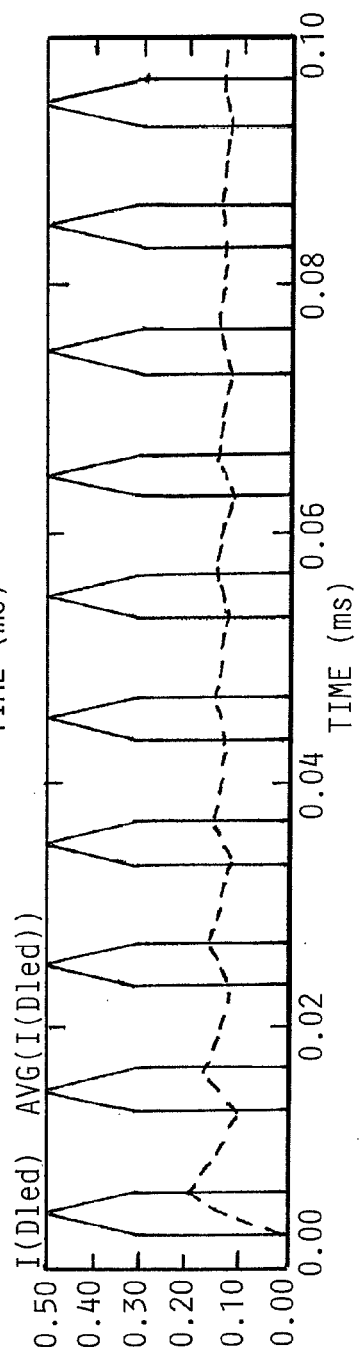
FIG. 7C is a circuit simulation waveform of instantaneous current and the average current in the LED array of the AC-to-DC converter of FIG. 1.

FIGS. 6C, 7C and 8C depict the instantaneous (shown by a solid line) and average (shown by a dashed line) current waveforms when the converter 8 uses the center conduction angle technique; and FIGS. 9C and 10C depict the instantaneous (shown by a solid line) and average current waveforms (shown by a dashed line) when the converter 8 uses the leading-edge conduction angle technique. When the conduction angle is placed at the center of signal source 10, the current waveform fidelity drawn from the signal source 10 is improved. Capacitor 12, as a preferred low impedance capacitor, does not generate any excessive current. This means that the current drawn from signal source 10 has an amplitude that is no larger than what is required by load 60. When an instantaneous current waveform replicates a line voltage waveform, it allows the power factor to be near unity. Thus, in a preferred embodiment the center conduction angle technique is used with minimal additional circuits and filters in order to improve power factor and reduce line current distortion. Comparing FIGS. 6C, 7C and 8C with FIGS. 9C and 10C shows that use of the center conduction angle technique creates an instantaneous current that is most like the signal source 10 as depicted in FIGS. 6A, 7A, 8A, 9A and 10A.

AC-to-DC converter 8 is called direct because it uses a single stage power conversion topology. Power conversion topologies that use two power conversion stages create a poor power factor because the first stage can require an uncontrolled full wave bridge for AC-to-DC conversion and the second stage can require a particular active-controlled switch to achieve DC-to-DC conversion. Achieving a high power factor in bridge rectifiers requires additional components or an additional switching topology. Since the original distortion is quite large, these additional filter components can become relatively large and increase cost, space and inefficiency of power conversion. In contrast, as discussed previously, single stage power conversion in AC-to-DC converter 8 improves power factor while minimizing the need for these additional filter components.

In addition to improving power factor, varying the center conduction angle achieves dimming of load 60. Since the center conduction angle technique allows for current conduction about a range of the peak of signal source 10, dimming is achieved by a control, as discussed previously, to vary the conduction time with minimal current magnitude variation. In contrast to the center conduction angle technique, varying the magnitude of current can cause poor quality light effects and limit the dimming range in load 60.

Figure 11:
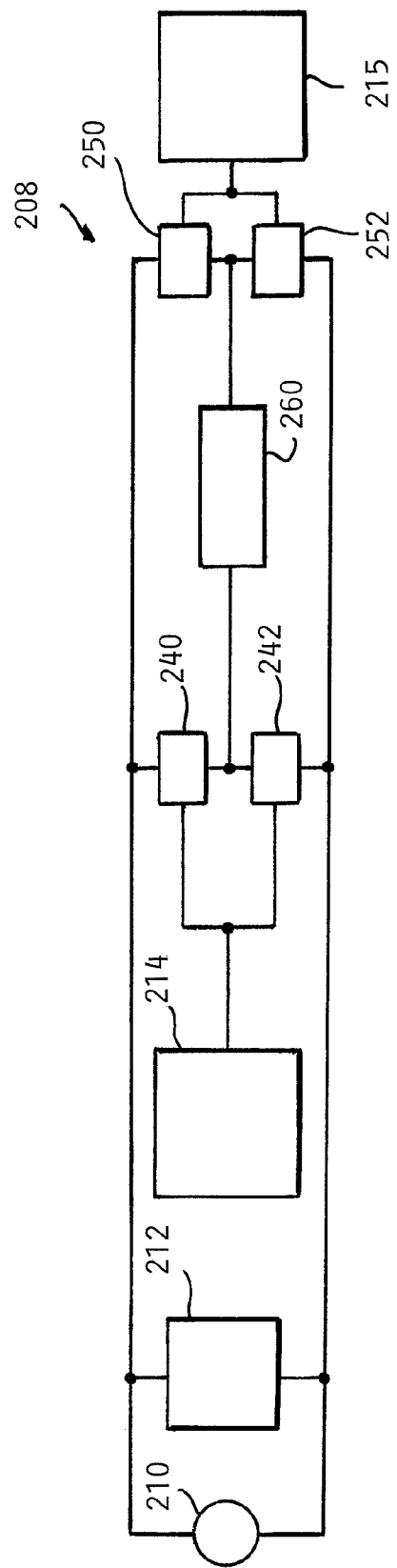
FIG. 11 is a block diagram of an AC-to-DC converter in accordance with another embodiment of the invention.

While AC-to-DC converter 8 is realized using the elements and/or components described above, other AC-to-DC converters may be realized using other elements and/or components. For example, FIG. 11 illustrates a generalized block diagram of an embodiment of an AC-to-DC converter which can be realized by the same or different components described in FIGS. 1-5. AC-to-DC converter 208 can receive any signal (i.e. a universal signal) from a signal source 210 similar to signal source 10. The universal signal provide to a filter 212. Filter 212 is connected in parallel to the signal source 210. Filter 212 can be an AC link capacitor, as discussed previously, or one or more of any other suitable filtering component. Switching circuits 240 and 242 are connected in parallel with filter 212 and switching circuits 250 and 252 are connected in parallel with switching circuit 240 and 242. Switching circuits 240, 242, 250 and 252 can each be realized by a pair of bi-directional voltage and current switches, but may also be realized by any other components or elements. A load 260, such as one or more LEDs, is connected between the switching circuits 240 and 242 and the switching circuits 250 and 252. Switching circuits 240 and 242 are controlled by control circuitry 214, and switching circuits 250 and 252 are controlled control circuitry 216. Control circuitry 214 and control circuitry 216 can be realized by any suitable means, such as an application specific integrated circuit. Further, a buffer and/or amplifier may be coupled between control circuitry 214 and control circuitry 216 and the switching circuits 240 and 242 and the switching circuits 250 and 252, respectively. Of course, the control circuitry 214 and 216 may be implemented by any other suitable combination of hardware and/or software. As discussed previously, control circuitry 214 and control circuitry 216 can be designed such that, for example, a forward-operating current and/or a reverse-operating current is supplied to the load 260 when certain conditions exist.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A power converter circuit for a LED lighting device, comprising:
a pair of input terminals adapted to be connected to a signal source;
at least one LED;
a first control circuit adapted to supply current to the at least one LED and including:
a first bi-directional switch connected between one input terminal and one side of the at least one LED, and a second bi-directional switch connected between the other side of the at least one LED and the other input terminal, wherein current flows through the at least one LED in a predetermined direction when both of the first and second bi-directional switches are conducting in a first direction; and
a second control circuit adapted to supply current to the at least one LED and including:
a third bi-directional switch connected between the other input terminal and the one side of the at least one LED, and a fourth bi-directional switch connected between the one input terminal and the other side of the at least one LED, wherein current flows through the at least one LED in the predetermined direction when both of the third and fourth bi-directional switches are conducting in a second direction.

2. The power converter circuit of claim 1, further comprising:
first and second control circuits configured to control when the first and second bi-directional switches conduct in the first direction and further configured to control when the third and fourth bi-directional switches conduct in the second direction.

3. The power converter circuit of claim 2, wherein the first control circuit is connected to the first and third bi-directional switches and the second control circuit is connected to the second and fourth bi-directional switches.

4. The power converter circuit of claim 2, wherein current flows in the predetermined direction to supply one of a forward-operating current and a reverse-operating current through the at least one LED.

5. The power converter circuit of claim 2, wherein current flows through the at least one LED in a direction opposite the predetermined direction when both of the first and second bi-directional switches are conducting in the second direction and when both of the third and fourth bi-directional switches are conducting in the first direction.

6. The power converter circuit of claim 2, wherein the first and second control circuits are integrated circuits.

7. The power converter circuit of claim 1, wherein current flows in the direction opposite the predetermined direction to supply one of a forward-operating current and a reverse-operating current through the at least one LED.

8. The power converter circuit of claim 1, further comprising:
a filter connected between the pair of input terminals.

9. The power converter circuit of claim 1, wherein at least one of the first, second, third and fourth bi-directional switches includes a MOSFET switch.

10. The power converter circuit of claim 1, wherein the signal source is at least one of a 110/220 VAC single phase direct connect, a high frequency ballast, a low frequency ballast and a DC signal source.

11. A method of supplying power to a LED lighting device through a power converter including first, second, third and fourth bi-directional switches and first and second control circuits, the method comprising:
receiving a current signal;
generating a first control signal through the first control circuit for the first and third bi-directional switches;
generating a second control signal through the second control circuit for the second and fourth bi-directional switches; and
supplying the current signal to the at least one LED in a predetermined direction when one of the first and second bi-directional switches are conducting in a first direction and the third and fourth bi-directional switches are conducting in a second direction in response to the first and second control signals.

12. The method of claim 11, further comprising:
filtering the current signal.

13. The method of claim 11, wherein the first and second control signals are PWM drive signals.

14. The method of claim 13, the method further comprising:
driving the first bi-directional switch to ON in response to the first PWM drive signal;
driving the second bi-directional switch to ON in response to the second PWM drive signal;
driving the third bi-directional switch to OFF in response to the first PWM drive signal; and
driving the fourth bi-directional switch to OFF in response to the second PWM drive signal.

15. The method of claim 13, wherein the current signal has a first state and a second state and wherein generating the first PWM drive signal through the first control circuit comprises:
detecting a polarity signal in response to one of the first state and the second state; and
buffering the polarity signal to produce the first PWM drive signal in response to the first state.

16. The method of claim 15 wherein the first PWM drive signal is centered about the current signal during the first state.

17. The method of claim 13 wherein the current signal has a first state and a second state and wherein generating the second PWM drive signal through the second control circuit comprises:
generating a polarity signal in response to one of the first state and the second state;
generating a synchronized carrier signal;
detecting a conduction signal;
comparing the synchronized carrier signal and the conduction signal;
generating a first comparison signal and a second comparison signal in response to the carrier signal and the conduction signal; and
applying the polarity signal, the first comparison signal and the second comparison signal to produce the second PWM drive signal in response to the second state.

18. The method of claim 17, further comprising:
varying the conduction signal to achieving dimming of the plurality of LEDs.

19. The method of claim 17, wherein the second PWM drive signal is centered about the current signal during the second state.

20. The method of claim 17, wherein the second PWM drive signal is positive when at least one of
(a) the first comparison signal is positive, the second comparison signal is negative, and the polarity signal is negative;
(b) the first comparison signal is positive and the polarity signal is positive; and
(c) the second comparison signal is positive and the polarity signal is positive.

21. The method of claim 11, further comprising:
supplying the current signal to the at least one LED in a direction opposite the predetermined direction when one of the first and second bi-directional switches are conducting in the second direction and the third and fourth bi-directional switches are conducting in the second direction in response to the first and second control signals.

22. The method of claim 11, wherein supplying the current signal to the at least one LED comprises:
supplying one of a forward-operating current and a reverse-operating current to the at least one LED.

* * * * *